United States Patent
Lee et al.

(10) Patent No.: US 12,474,429 B2
(45) Date of Patent: Nov. 18, 2025

(54) DEVICE AND METHOD FOR ESTIMATING ANGLE OF RECEPTION SIGNAL

(71) Applicant: LG ELECTRONICS INC., Seoul (KR)

(72) Inventors: Sangrim Lee, Seoul (KR); Hojae Lee, Seoul (KR); Kijun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 18/002,210

(22) PCT Filed: Jun. 19, 2020

(86) PCT No.: PCT/KR2020/007940
§ 371 (c)(1),
(2) Date: Dec. 16, 2022

(87) PCT Pub. No.: WO2021/256586
PCT Pub. Date: Dec. 23, 2021

(65) Prior Publication Data
US 2023/0236278 A1   Jul. 27, 2023

(51) Int. Cl.
*G01S 3/48* (2006.01)
*G01S 3/04* (2006.01)

(52) U.S. Cl.
CPC ............... *G01S 3/043* (2013.01); *G01S 3/48* (2013.01)

(58) Field of Classification Search
CPC ........................................ G01S 3/043
USPC .......................................... 455/456.1
See application file for complete search history.

(56) References Cited

U.S. PATENT DOCUMENTS

| 2012/0257653 | A1* | 10/2012 | Nagaishi | H01Q 3/2682 342/374 |
| 2014/0079386 | A1* | 3/2014 | Yasuda | H04B 10/616 398/16 |

FOREIGN PATENT DOCUMENTS

| JP | 2000-065911 | 3/2000 |
| JP | 2013-102506 | 5/2013 |
| JP | 2013-243478 | 12/2013 |
| KR | 10-2017-0007777 | 1/2017 |
| KR | 2019-0012532 | 2/2019 |
| KR | 10-1955102 | 3/2019 |

OTHER PUBLICATIONS

PCT International Application No. PCT/KR2020/007940, International Search Report dated Mar. 9, 2021, 4 page.
Ericsson, "Considerations for deriving a blocking requirement for NR," R4-1700218, 3GPP TSG-RAN WG4 NR AH, Jan. 2017, 7 pages.
Korean Intellectual Property Office Application No. 10-2022-7044596, Office Action dated Nov. 5, 2024, 5 pages.
European Patent Office Application Serial No. 20941327.7, Search Report dated Feb. 26, 2024, 8 pages.
Kim et al., "Channel AoA Estimation for Massive MIMO Systems Using One-Bit ADCs," XP011690766, Journal of Communications and Networks, vol. 20, No. 4, Aug. 2018, 9 pages.
Yoffe et al., "On Direction of Arrival Estimation with 1-bit Quantizer," XP033616824, Apr. 2019, 6 pages.

* cited by examiner

*Primary Examiner* — Qutbuddin Ghulamali
(74) *Attorney, Agent, or Firm* — LEE, HONG, DEGERMAN, KANG & WAIMEY

(57) ABSTRACT

Provided are a device and a method for estimating an angle of arrival (AoA) and an angle of departure (AoD) in a communication system having 1-bit quantization.

8 Claims, 54 Drawing Sheets

W, $W_Q$, $W_{Q+1}$ (analog signal),
$Y_Q$, $Y_{Q+1}$ (quantized digital signal)

W : received signal from antenna (analog signal)
$W_{Q+1}$ : W - $S_Q$ + $W_Q$
$Y_Q$: Input signal passed from previous block

DEVICE AND METHOD FOR ESTIMATING ANGLE OF RECEPTION SIGNAL

CROSS-REFERENCE TO RELATED APPLICATION(S)

This application is the National Stage filing under 35 U.S.C. 371 of International Application No. PCT/KR2020/007940, filed on Jun. 19, 2020, the contents of which is hereby incorporated by reference herein in its entirety.

BACKGROUND OF THE DISCLOSURE

Field of the Disclosure

The present disclosure relates to wireless communication.

Related Art

The 6G system is aimed at (i) very high data rates per device, (ii) a very large number of connected devices, (iii) global connectivity, (iv) very low latency, (v) lower energy consumption of battery-free IoT devices, (vi) an ultra-reliable connection, (vii) connected intelligence with machine learning capabilities, etc. The vision of 6G systems can be four aspects: intelligent connectivity, deep connectivity, holographic connectivity and ubiquitous connectivity.

In a 6G system, a larger number of antennas are required, and power consumption burden of a terminal increases to use a high-performance ADC while using a plurality of antennas. Accordingly, application of an ADC having a low number of bits is being discussed in a 6G system. In this case, accuracy of AoA and AoD estimation may be a problem as an ADC having a low number of bits is used.

SUMMARY

A method and apparatus for estimating an angle of arrival (AoA) and an angle of departure (AoD) in a communication system having 1-bit quantization are proposed.

According to the present specification, it is possible to increase the accuracy of AoA and AoD estimation of a signal while using an ADC having a low number of bits. Thus, communication efficiency increases.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
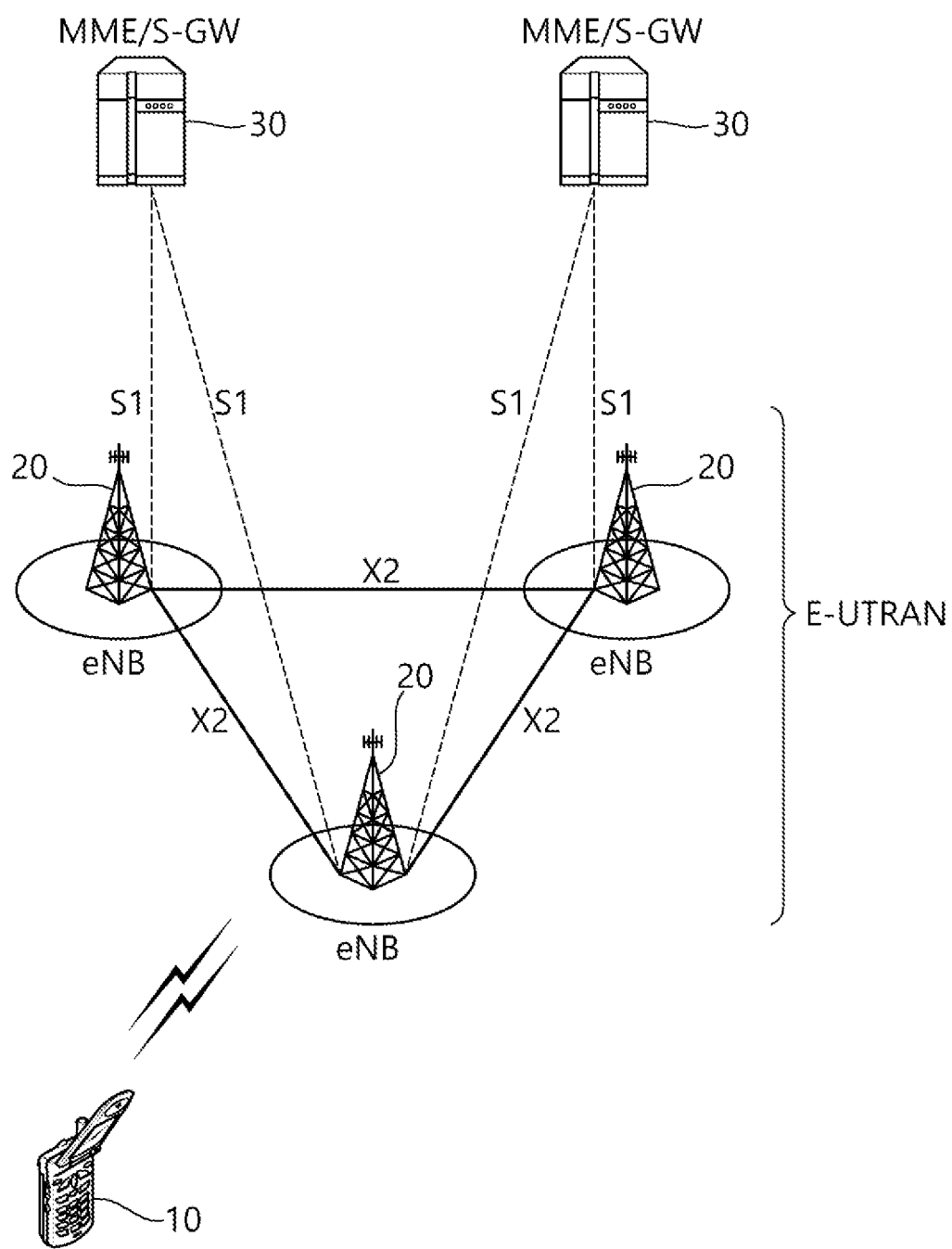
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
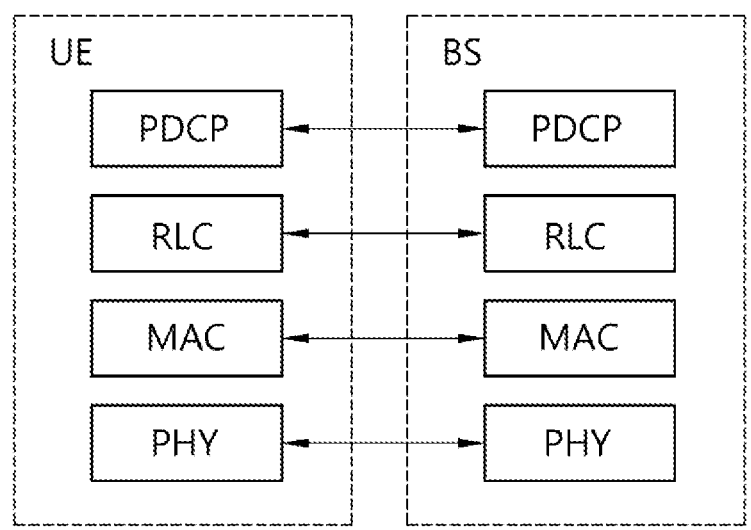
FIG. 2 is a diagram showing a wireless protocol architecture for a user plane.
Figure 3:
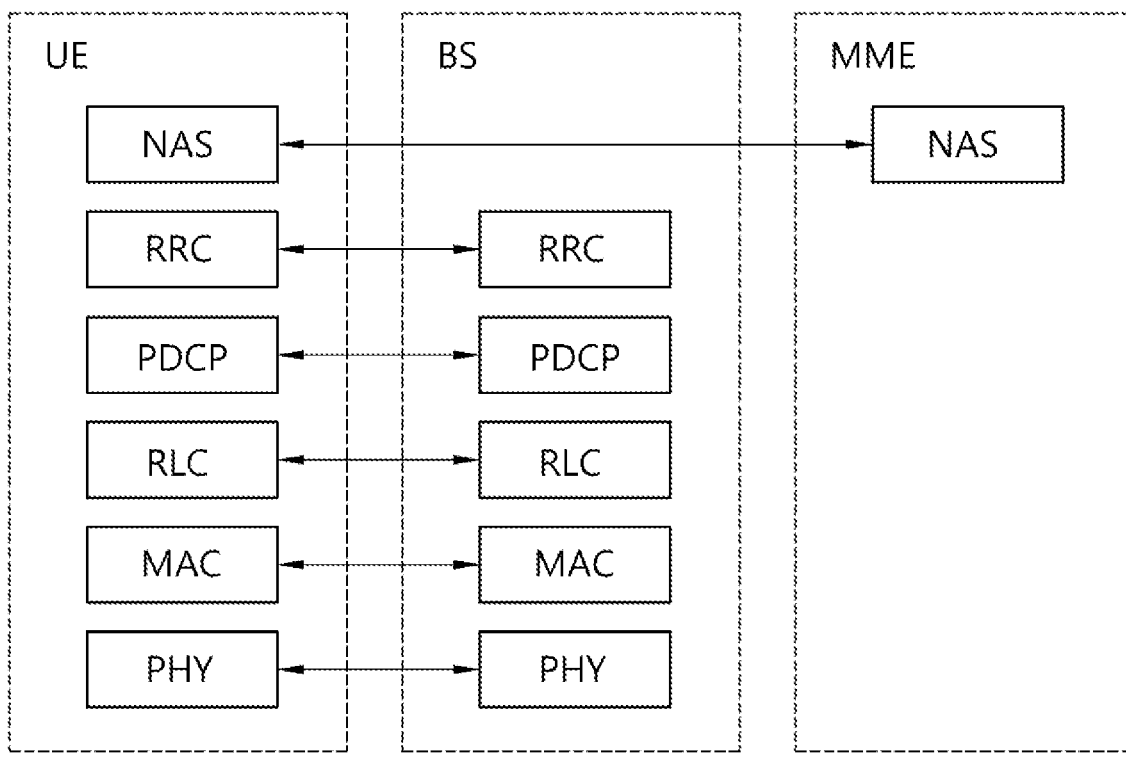
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
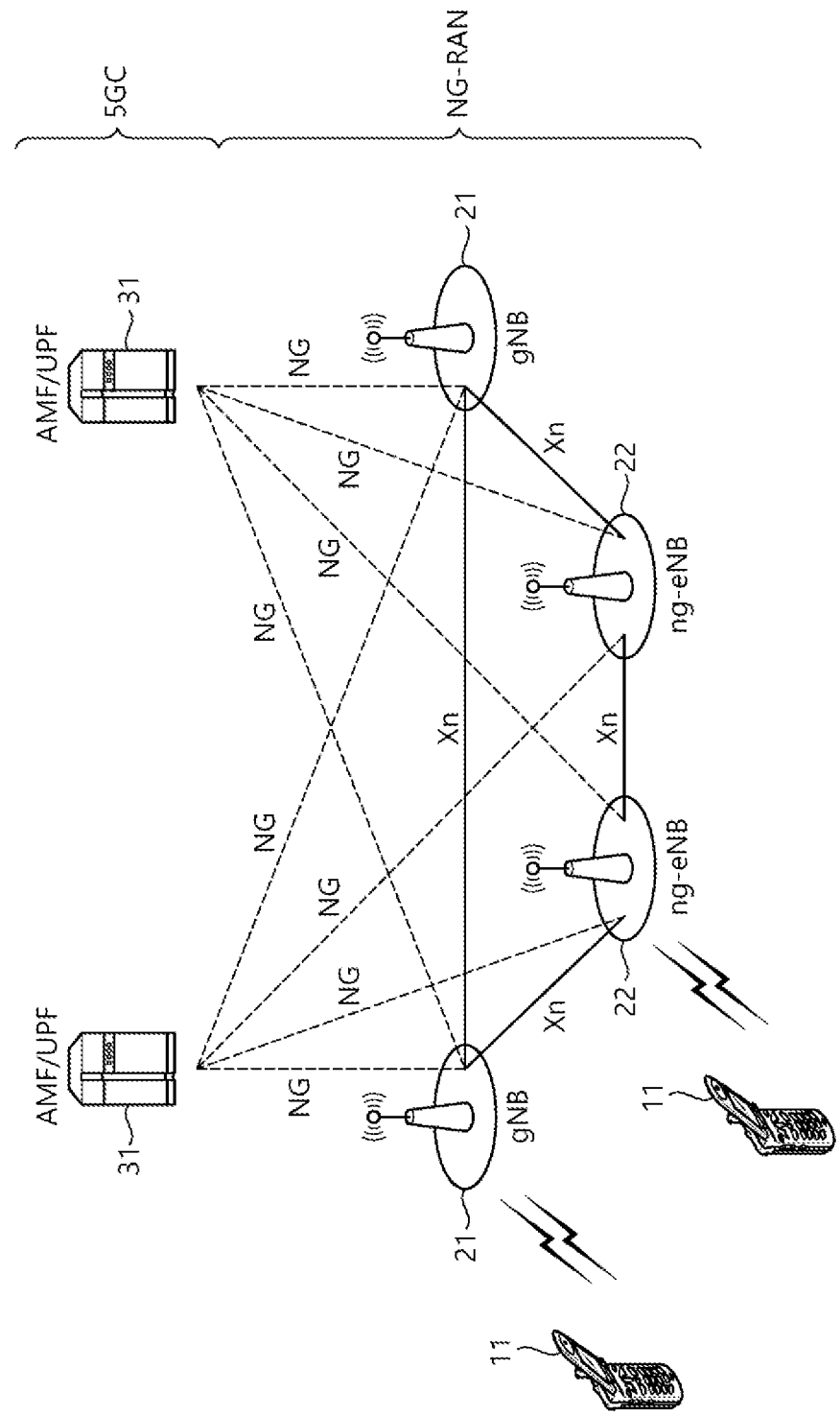
FIG. 4 shows another example of a wireless communication system to which the technical features of the present disclosure can be applied.

FIG. 4 shows another example of a wireless communication system to which the technical features of the present disclosure can be applied.

Specifically, FIG. 4 illustrates a system architecture based on a 5G new radio access technology (NR) system. An entity used in the 5G NR system (hereinafter, simply referred to as "NR") may absorb some or all functions of entities introduced in FIG. 1 (e.g., eNB, MME, S-GW). An entity used in the NR system may be identified with the name "NG" to distinguish it from LTE.

Referring to FIG. 4, the wireless communication system includes one or more UEs 11, a next-generation RAN (NG-RAN), and a 5th generation core network (5GC). NG-RAN consists of at least one NG-RAN node. An NG-RAN node is an entity corresponding to the BS 20 shown in FIG. 1. An NG-RAN node consists of at least one gNB 21 and/or at least one ng-eNB 22. The gNB 21 provides termination of the NR user plane and control plane protocols towards the UE 11. Ng-eNB 22 provides termination of E-UTRA user plane and control plane protocols towards UE 11.

5GC includes access and mobility management function (AMF), user plane function (UPF) and session management function (SMF). AMF hosts functions such as NAS security, idle state mobility handling, and more. AMF is an entity that includes the functions of a conventional MME. UPF hosts functions such as mobility anchoring and protocol data unit (PDU) processing. A UPF is an entity that includes the functions of a conventional S-GW. The SMF hosts functions such as UE IP address allocation and PDU session control.

The gNB and ng-eNB are interconnected through the Xn interface. gNB and ng-eNB are also connected to 5GC through NG interface. More specifically, it is connected to the AMF through the NG-C interface and to the UPF through the NG-U interface.

Figure 5:
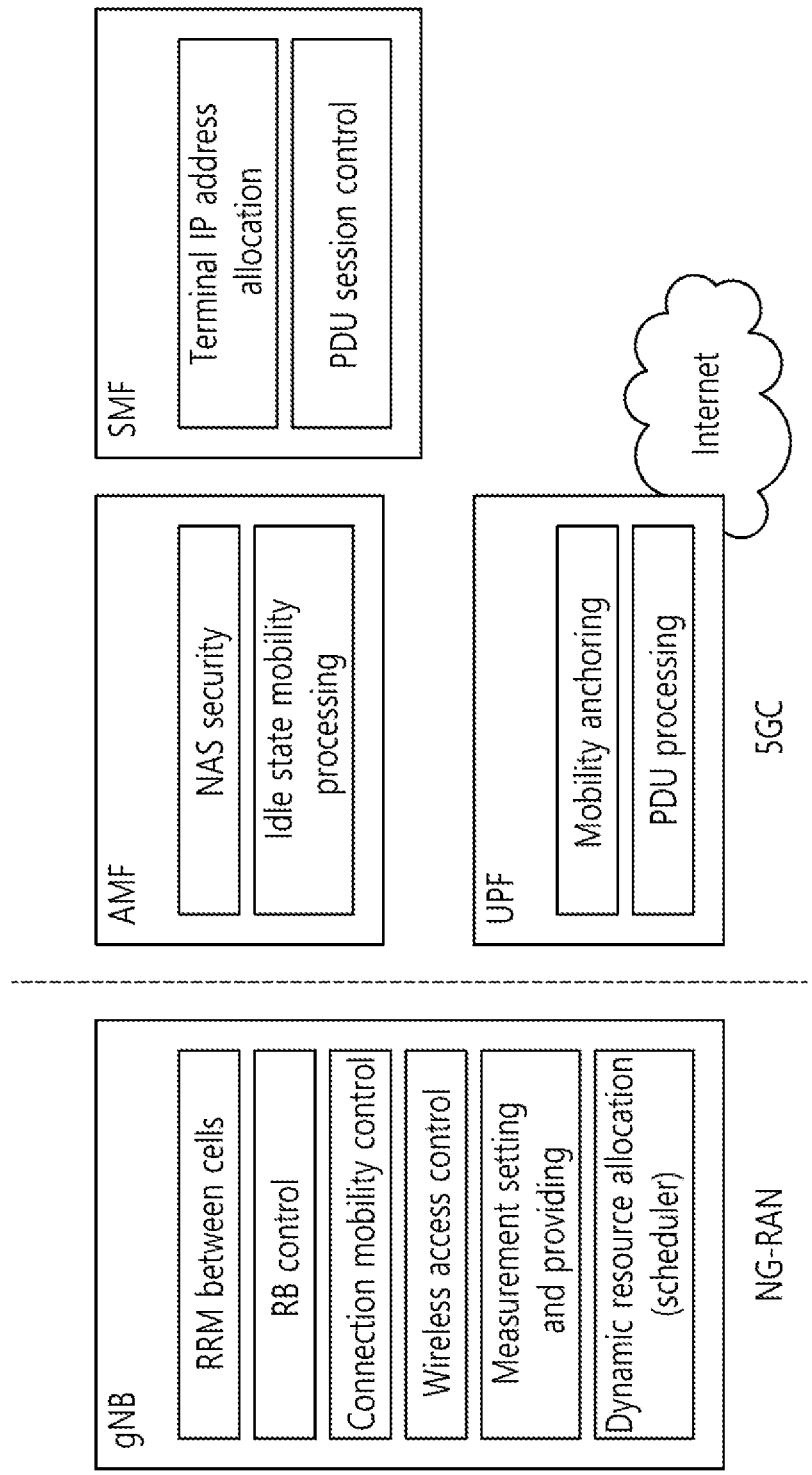
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
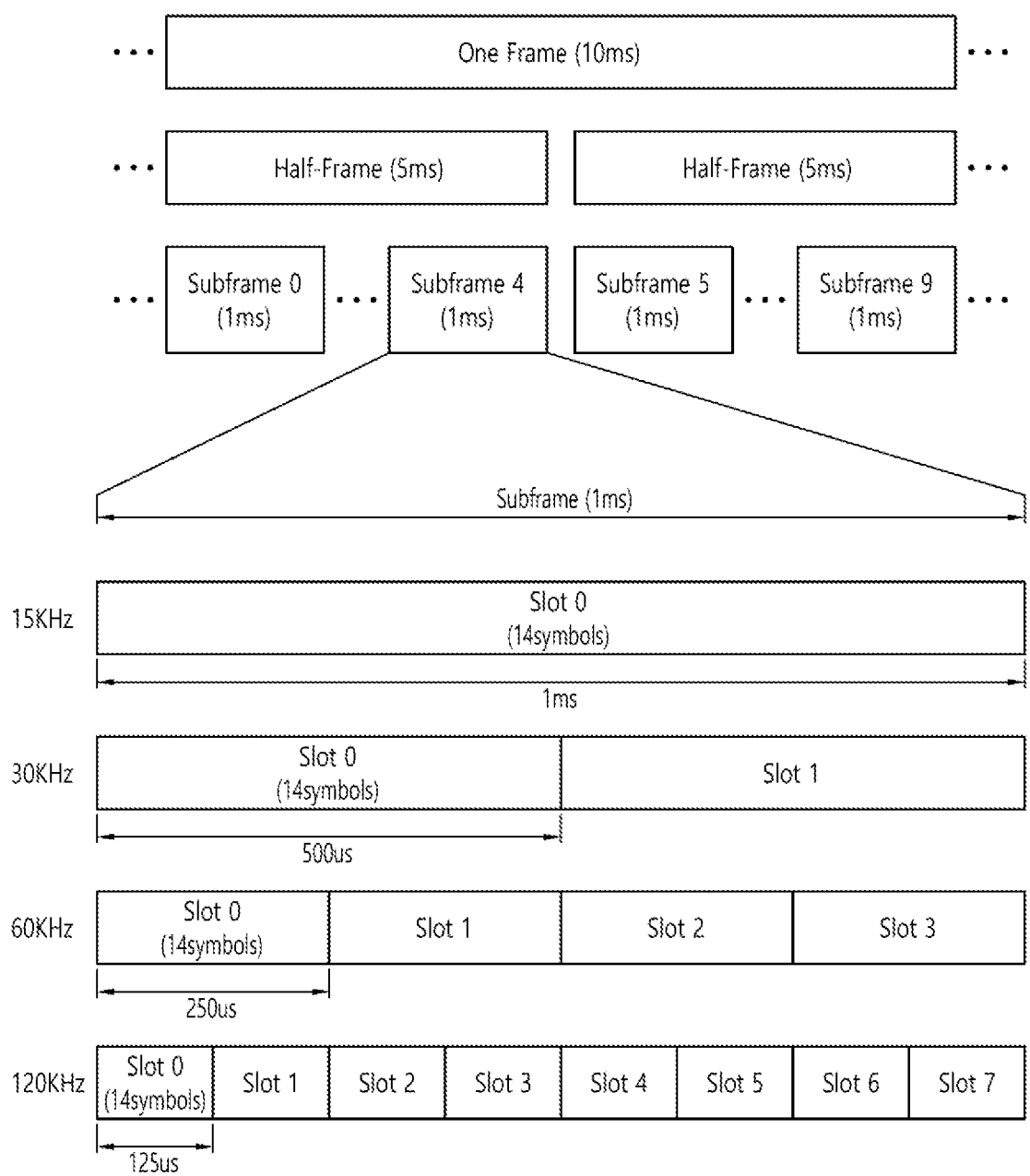
FIG. 6 illustrates an example of a frame structure that may be applied in NR.

FIG. 6 illustrates an example of a frame structure that may be applied in NR.

Referring to FIG. 6, a frame may consist of 10 milliseconds (ms) and may include 10 subframes of 1 ms.

Uplink and downlink transmissions in NR may be composed of frames. A radio frame has a length of 10 ms and may be defined as two 5 ms half-frames (Half-Frame, HF). A half-frame may be defined as five 1 ms subframes (Subframes, SFs). A subframe is divided into one or more slots, and the number of slots in a subframe depends on Subcarrier Spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or CP-OFDM symbol) and an SC-FDMA symbol (or DFT-s-OFDM symbol).

One or a plurality of slots may be included in the subframe according to the subcarrier spacing.

The following table 1 illustrates a subcarrier spacing configuration.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS(15 * 2^μ) | $N^{slot}_{symb}$ | $N^{frame,\mu}_{slot}$ | $N^{subframe,\mu}_{slot}$ |
|---|---|---|---|
| 60 KHz (μ = 2) | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
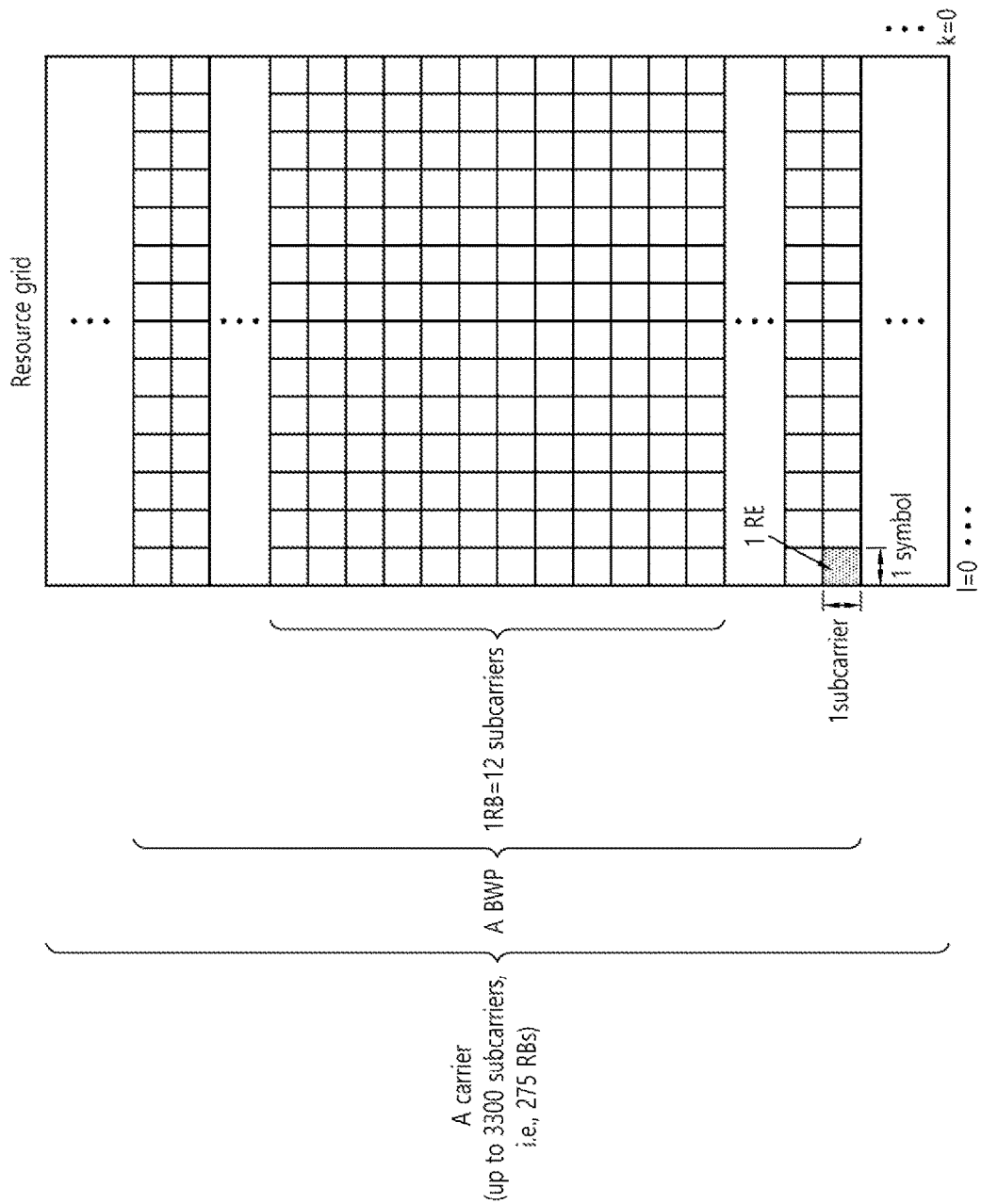
FIG. 7 shows a slot structure.

FIG. 7 shows a slot structure.

Referring to FIG. 7, a slot includes a plurality of symbols in the time domain. For example, in the case of a normal CP, one slot includes 14 symbols, but in the case of an extended CP, one slot may include 12 symbols. Alternatively, in the case of a normal CP, one slot includes 7 symbols, but in the case of an extended CP, one slot may include 6 symbols.

A carrier includes a plurality of subcarriers in the frequency domain. A resource block (RB) may be defined as a plurality of (eg, 12) consecutive subcarriers in the frequency domain. A bandwidth part (BWP) may be defined as a plurality of consecutive (P)RBs in the frequency domain, and may correspond to one numerology (eg, SCS, CP length, etc.). A carrier may include up to N (eg, 5) BWPs. Data communication may be performed through an activated BWP. Each element may be referred to as a resource element (RE) in the resource grid, and one complex symbol may be mapped.

A physical downlink control channel (PDCCH) may include one or more control channel elements (CCEs) as illustrated in the following table 4.

TABLE 4

| Aggregation level | Number of CCEs |
|---|---|
| 1 | 1 |
| 2 | 2 |
| 4 | 4 |
| 8 | 8 |
| 16 | 16 |

That is, PDCCH may be transmitted through a resource configured with 1, 2, 4, 8, or 16 CCE(s). Here, the CCE is configured with 6 REGs (resource element groups), and one REG is configured with one resource block in a frequency domain and one OFDM (orthogonal frequency division multiplexing) symbol in a time domain.

Meanwhile, in NR, a new unit called a control resource set (CORESET) may be introduced. The UE may receive the PDCCH in CORESET.

Figure 8:
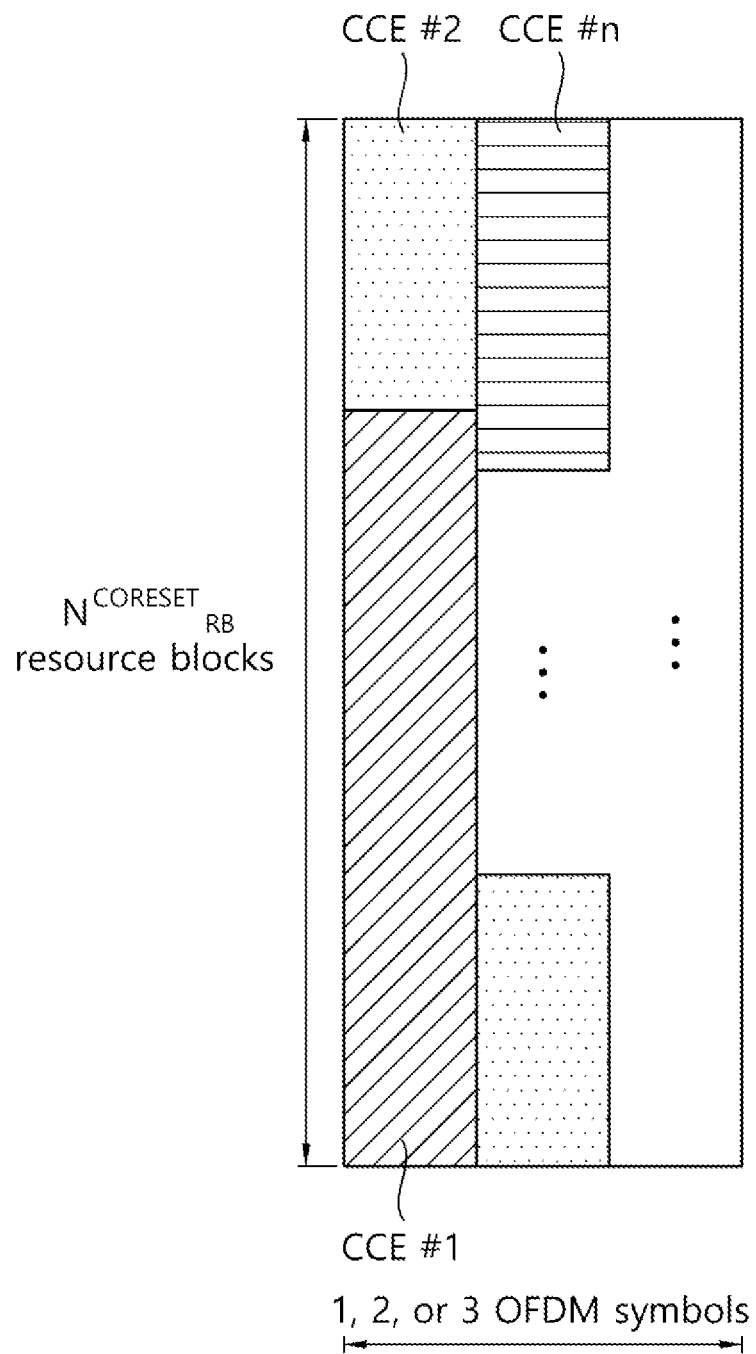
FIG. 8 illustrates a CORESET.

FIG. 8 illustrates a CORESET.

Referring to FIG. 8, the CORESET includes NCORESETRB resource blocks in the frequency domain, and $N^{CORESET}_{symb} \in \{1, 2, 3\}$ number of symbols in the time domain. NCORESETRB and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
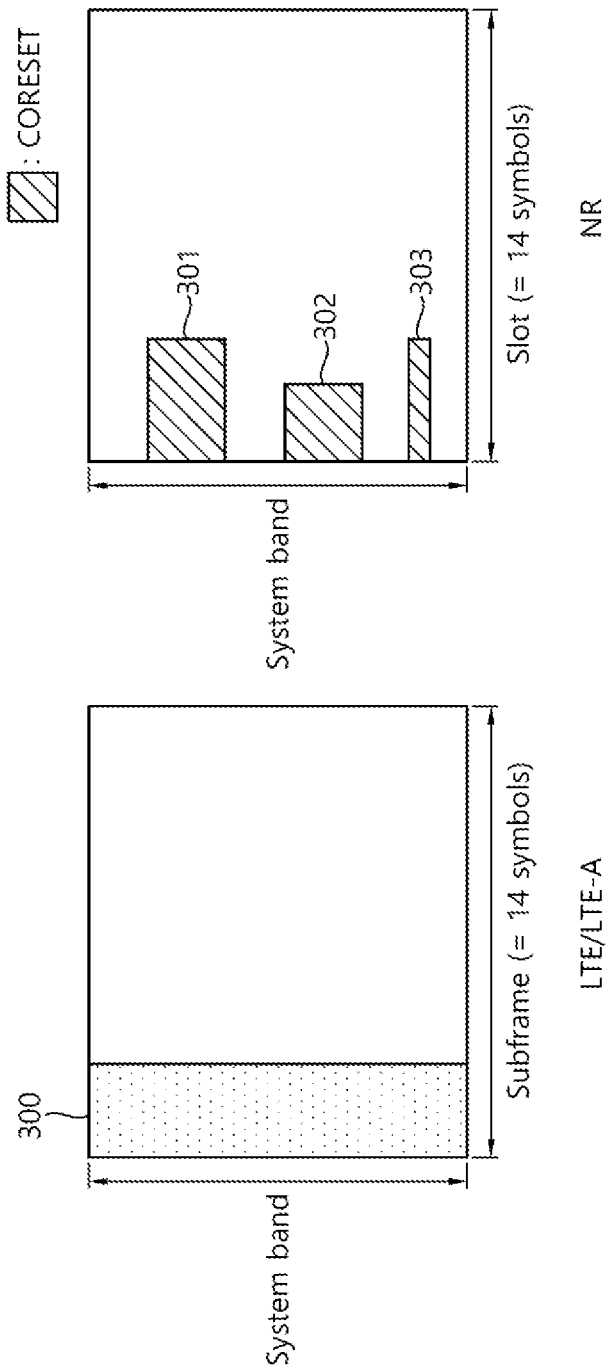
FIG. 9 is a diagram illustrating a difference between a conventional control region and the CORESET in NR.

FIG. 9 is a diagram illustrating a difference between a conventional control region and the CORESET in NR.

Referring to FIG. 9, a control region 300 in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, the aforementioned CORESET was introduced. The CORESETs 301, 302, and 303 may be referred to as radio resources for control information to be received by the terminal, and may use only a part of the system bandwidth instead of the entire system bandwidth. The base station can allocate a CORESET to each terminal, and can transmit control information through the allocated CORESET. For example, in FIG. 9, the first CORESET 301 may be allocated to terminal 1, the second CORESET 302 may be allocated to terminal 2, and the third CORESET 303 may be allocated to terminal 3. A UE in NR can receive control information of a base station even if it does not necessarily receive the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

Meanwhile, in NR, the following technologies/features can be applied.

<Self-Contained Subframe Structure>

Figure 10:
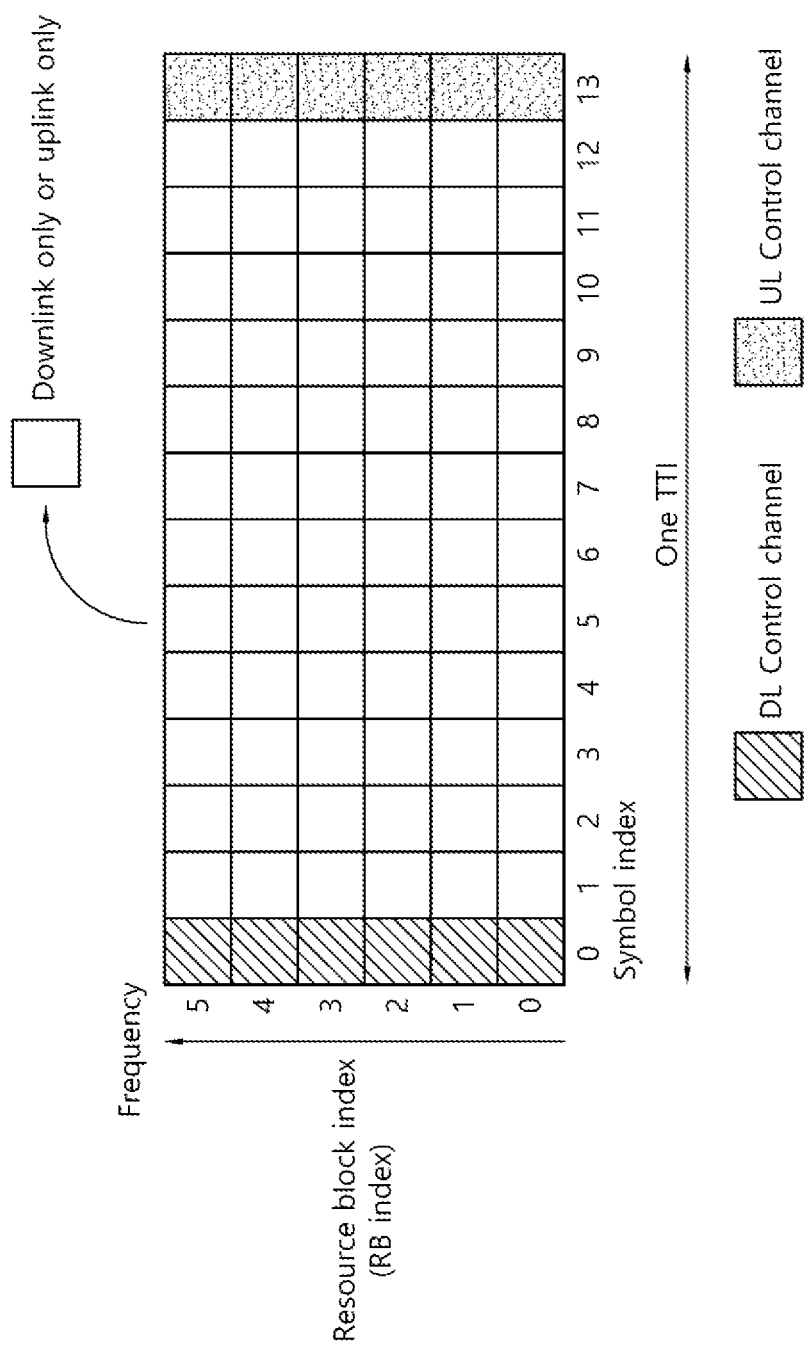
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
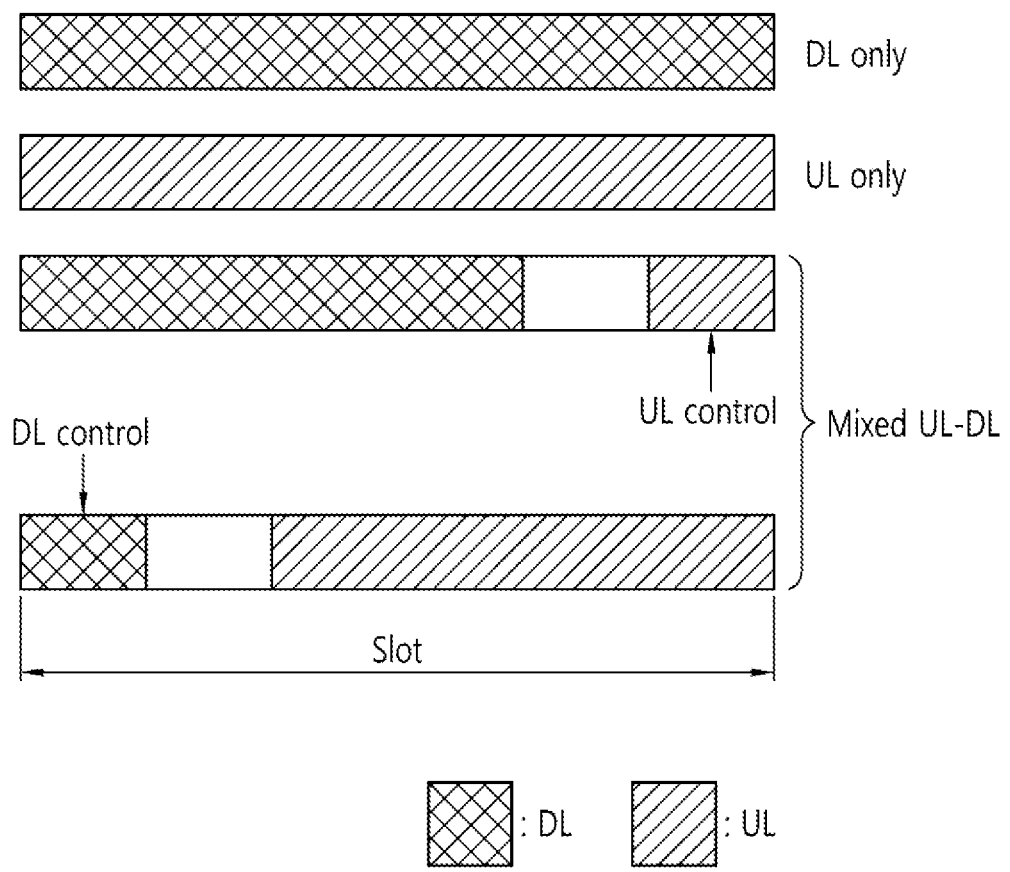
FIG. 11 is an example of a self-contained slot structure.

FIG. 11 is an example of a self-contained slot structure.

Referring to FIG. 11, one slot may have a self-contained structure in which a DL control channel, DL or UL data, and a UL control channel may all be included. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration

DL region+GP (Guard Period)+UL control region

DL control region+GP+UL region

Here, the DL region may include (i) a DL data region and (ii) a DL control region+a DL data region. The UL region may include (i) a UL data region and (ii) a UL data region+a UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
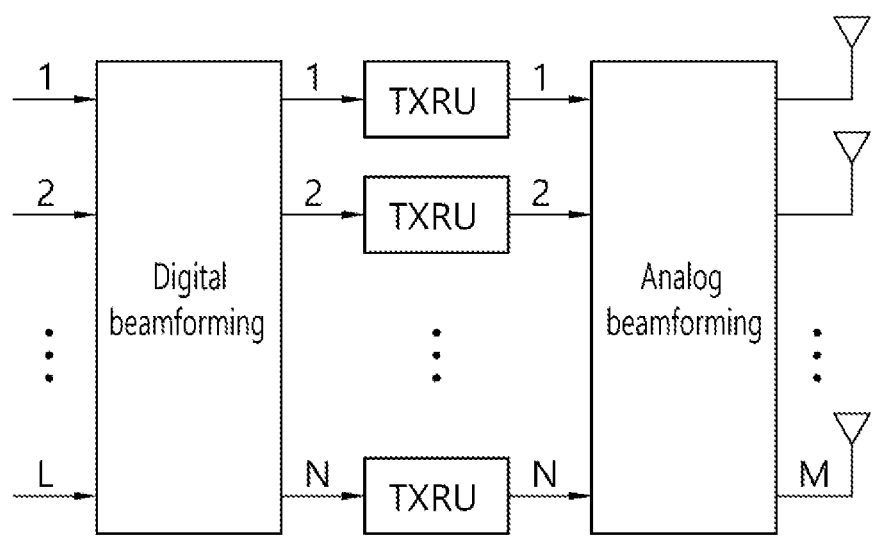
FIG. 12 is an abstract diagram of a hybrid beamforming structure in terms of the TXRU and the physical antenna.

FIG. 12 is an abstract diagram of a hybrid beamforming structure in terms of the TXRU and the physical antenna.

In FIG. 12, the number of digital beams is L, and the number of analog beams is N. Furthermore, in the NR system, a base station is designed to change analog beamforming in symbol units, and a direction in which more efficient beamforming is supported for a terminal located in a specific area is considered. Furthermore, when defining specific N TXRUs and M RF antennas as one antenna panel in FIG. 12, in the NR system, a method of introducing a plurality of antenna panels to which mutually independent hybrid beamforming is applicable is being considered.

As described above, when the base station utilizes a plurality of analog beams, since analog beams that are advantageous for signal reception may be different for each terminal, at least for synchronization signals, system information, paging, etc., a beam sweeping operation is being considered in which a plurality of analog beams to be applied by a base station are changed for each symbol in a specific subframe so that all terminals can have a reception opportunity.

Figure 13:
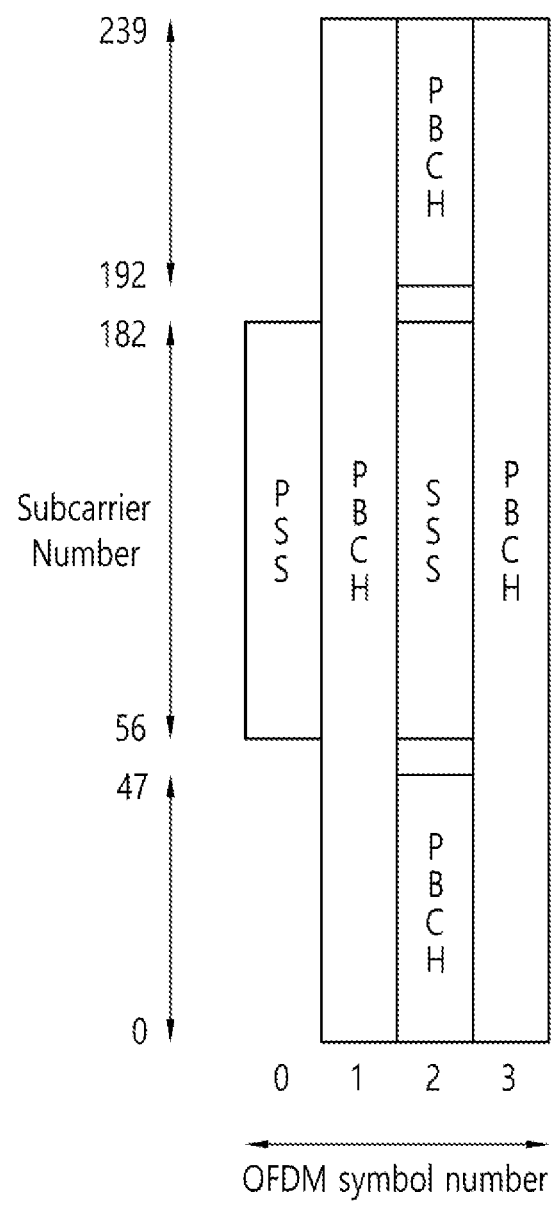
FIG. 13 shows a synchronization signal and a PBCH (SS/PBCH) block.

FIG. 13 shows a synchronization signal and a PBCH (SS/PBCH) block.

According to FIG. 13, the SS/PBCH block consists of PSS and SSS, each occupying 1 symbol and 127 subcarriers, and PBCH spanning 3 OFDM symbols and 240 subcarriers, but leaving an unused portion for SSS on one symbol in the middle. The periodicity of the SS/PBCH block may be set by the network, and the time position at which the SS/PBCH block may be transmitted may be determined by subcarrier spacing.

For PBCH, polar coding may be used. A UE may assume a band-specific subcarrier spacing for an SS/PBCH block unless the network configures the UE to assume a different subcarrier spacing.

PBCH symbols carry their own frequency-multiplexed DMRS. QPSK modulation may be used for PBCH. 1008 unique physical layer cell IDs may be given.

For a half frame having SS/PBCH blocks, first symbol indices for candidate SS/PBCH blocks are determined according to the subcarrier spacing of the SS/PBCH blocks described later.

Case A—Subcarrier spacing 15 kHz: The first symbols of candidate SS/PBCH blocks have an index of {2, 8}+14*n. For carrier frequencies below 3 GHz, n=0, 1. For carrier frequencies above 3 GHz and below 6 GHz, n=0, 1, 2, 3.

Case B—Subcarrier spacing 30 kHz: The first symbols of candidate SS/PBCH blocks have an index of {4, 8, 16, 20}+28*n. For carrier frequencies below 3 GHz, n=0. For carrier frequencies above 3 GHz and below 6 GHz, n=0, 1.

Case C—Subcarrier spacing 30 kHz: The first symbols of candidate SS/PBCH blocks have an index of {2, 8}+14*n. For carrier frequencies below 3 GHz, n=0, 1. For carrier frequencies above 3 GHz and below 6 GHz, n=0, 1, 2, 3.

Case D—Subcarrier spacing 120 kHz: The first symbols of candidate SS/PBCH blocks have an index of {4, 8, 16, 20}+28*n. For carrier frequencies above 6 GHz, n=0, 1, 2, 3, 5, 6, 7, 8, 10, 11, 12, 13, 15, 16, 17, 18.

Case E—Subcarrier spacing 240 kHz: The first symbols of candidate SS/PBCH blocks have an index of {8, 12, 16, 20, 32, 36, 40, 44}+56*n. For carrier frequencies above 6 GHz, n=0, 1, 2, 3, 5, 6, 7, 8.

Candidate SS/PBCH blocks in a half frame are indexed in ascending order from 0 to L−1 on the time axis. The UE must determine 2 LSB bits for L=4 and 3 LSB bits for L>4 of the SS/PBCH block index per half frame from one-to-one mapping with the index of the DMRS sequence transmitted in the PBCH. For L=64, the UE needs to determine 3 MSB bits of SS/PBCH block index per half frame by PBCH payload bits.

By the upper layer parameter 'SSB-transmitted-SIB1', indexes of SS/PBCH blocks in which the UE cannot receive other signals or channels within REs overlapping with REs corresponding to the SS/PBCH blocks may be set. In addition, by the upper layer parameter 'SSB-transmitted', within REs overlapping SS/PBCH blocks and corresponding REs, indexes of SS/PBCH blocks per serving cell in which the UE cannot receive other signals or channels may be set. Settings by 'SSB-transmitted' can take precedence over settings by 'SSB-transmitted-SIB1'. Periodicity of a half frame for reception of SS/PBCH blocks per serving cell may be configured by an upper layer parameter 'SSB-periodicity-ServingCell'. If the terminal does not receive the periodicity of the half frame for reception of SS/PBCH blocks, the terminal must assume periodicity of half frames. The UE may assume that the periodicity is the same for all SS/PBCH blocks within the serving cell.

Figure 14:
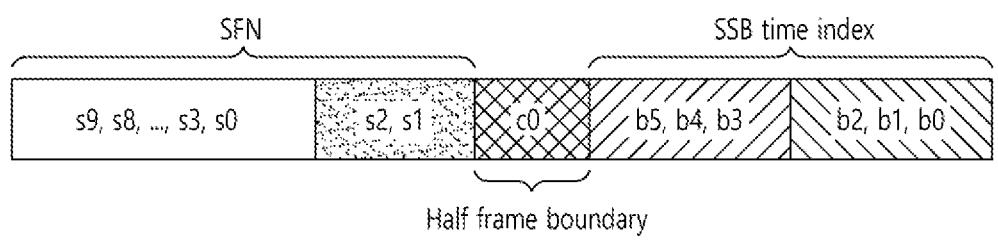
FIG. 14 is for explaining a method for a terminal to acquire timing information.

FIG. 14 is for explaining a method for a terminal to acquire timing information.

First, the terminal can obtain 6-bit SFN information through the MIB (Master Information Block) received in the PBCH. In addition, SFN 4 bits can be obtained in the PBCH transport block.

Second, the UE can obtain a 1-bit half frame indicator as part of the PBCH payload. Below 3 GHz, the half frame indicator may be implicitly signaled as part of the PBCH DMRS for Lmax=4.

Finally, the UE can obtain the SS/PBCH block index by the DMRS sequence and PBCH payload. That is, LSB 3 bits of the SS block index can be obtained by the DMRS sequence during a period of 5 ms. Additionally, MSB 3 bits of timing information are explicitly carried within the PBCH payload (for above 6 GHz).

In initial cell selection, the UE may assume that half frames with SS/PBCH blocks occur with a periodicity of 2 frames. When SS/PBCH block is detected, if $k_{SSB} \leq 23$ for FR1 and $k_{SSB} \leq 11$ for FR2, the UE determines that a control resource set for the Type0-PDCCH common search space exists. If $k_{SSB} > 23$ for FR1 and $k_{SSB} > 11$ for FR2, the UE determines that the control resource set for the Type0-PDCCH common search space does not exist.

For a serving cell without transmission of SS/PBCH blocks, the UE acquires time and frequency synchronization of the serving cell based on reception of SS/PBCH blocks on the primary cell or PSCell of the cell group for the serving cell.

Hereinafter, acquisition of system information will be described.

System information (SI) is divided into a master information block (MIB) and a plurality of system information blocks (SIBs) where:

the MIB is transmitted always on a BCH according to a period of 80 ms, is repeated within 80 ms, and includes parameters necessary to obtain system information block type1 (SIB1) from a cell;

SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;

SIBs other than SIB1 are carried via system information (SI) messages transmitted on the DL-SCH. Each SI message is transmitted within a time-domain window (referred to as an SI window) periodically occurring;

For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
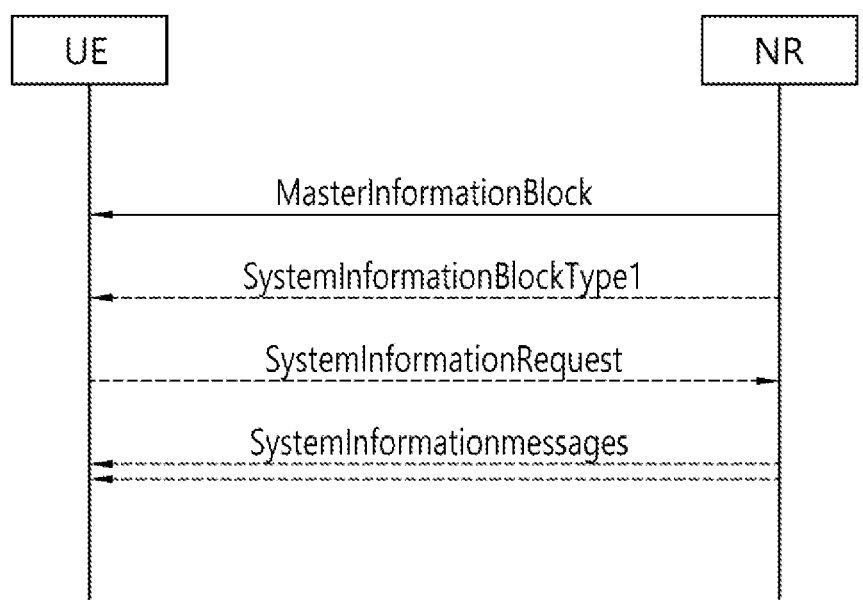
FIG. 15 illustrates an example of a system information acquisition process of a UE.

FIG. 15 illustrates an example of a system information acquisition process of a UE.

Referring to FIG. 15, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 5.

TABLE 5

|  | Type of signal | Operation/obtained information |
| --- | --- | --- |
| Step 1 | Uplink PRACH preamble | To obtain initial beam<br>Random election of RA-preamble ID |
| Step 2 | Random access response on DL-SCH | Timing alignment information<br>RA-preamble ID<br>Initial uplink grant, temporary C-RNTI |
| Step 3 | Uplink transmission on UL-SCH | RRC connection request<br>UE identifier |
| Step 4 | Downlink contention resolution | C-RNTI on PDCCH for initial access<br>C-RNTI on PDCCH for RRC_CONNECTED UE |

Figure 16:
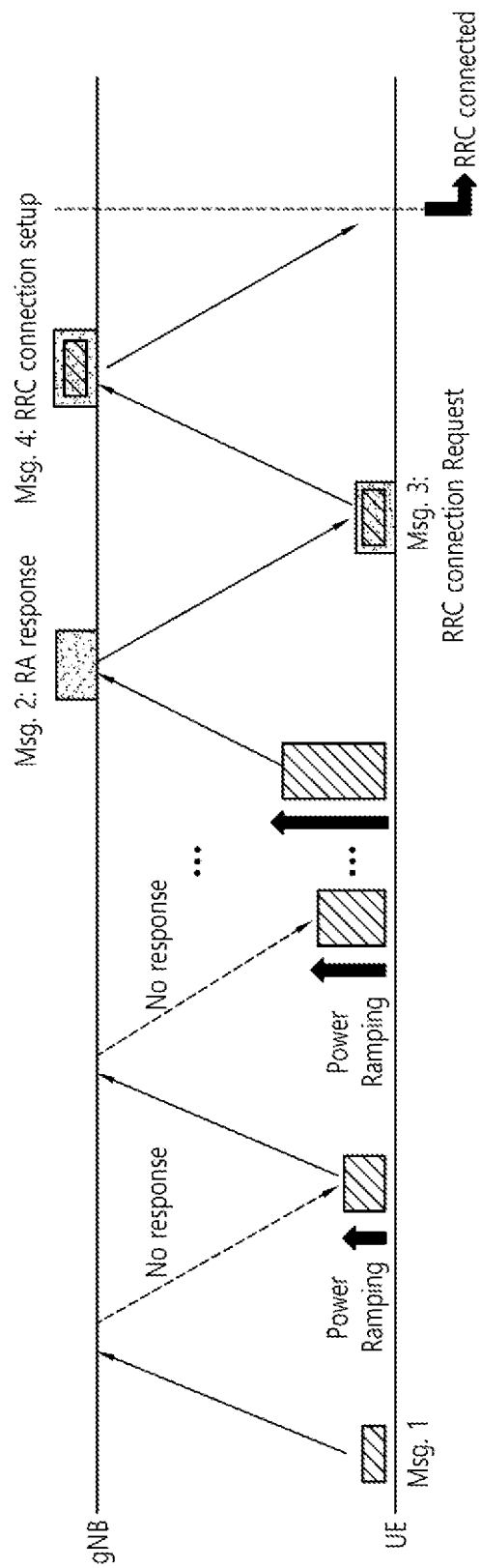
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
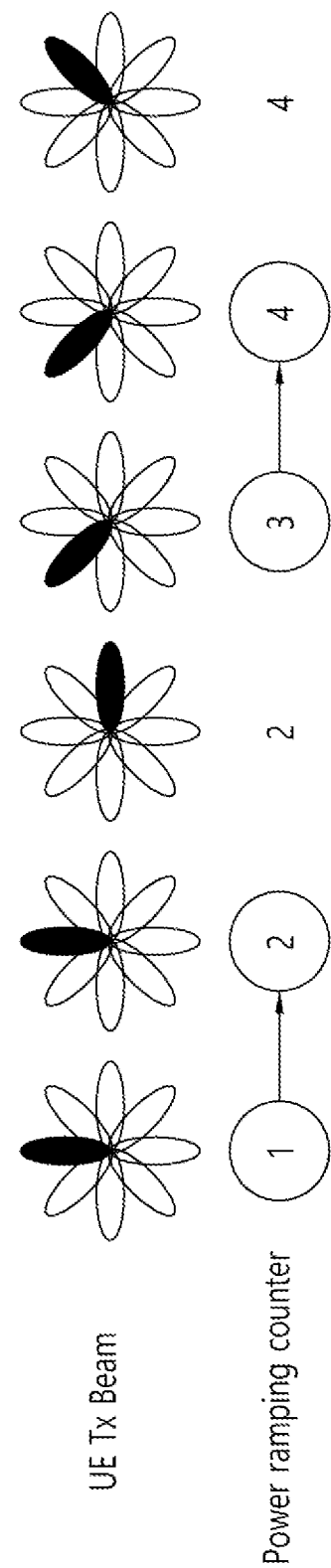
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
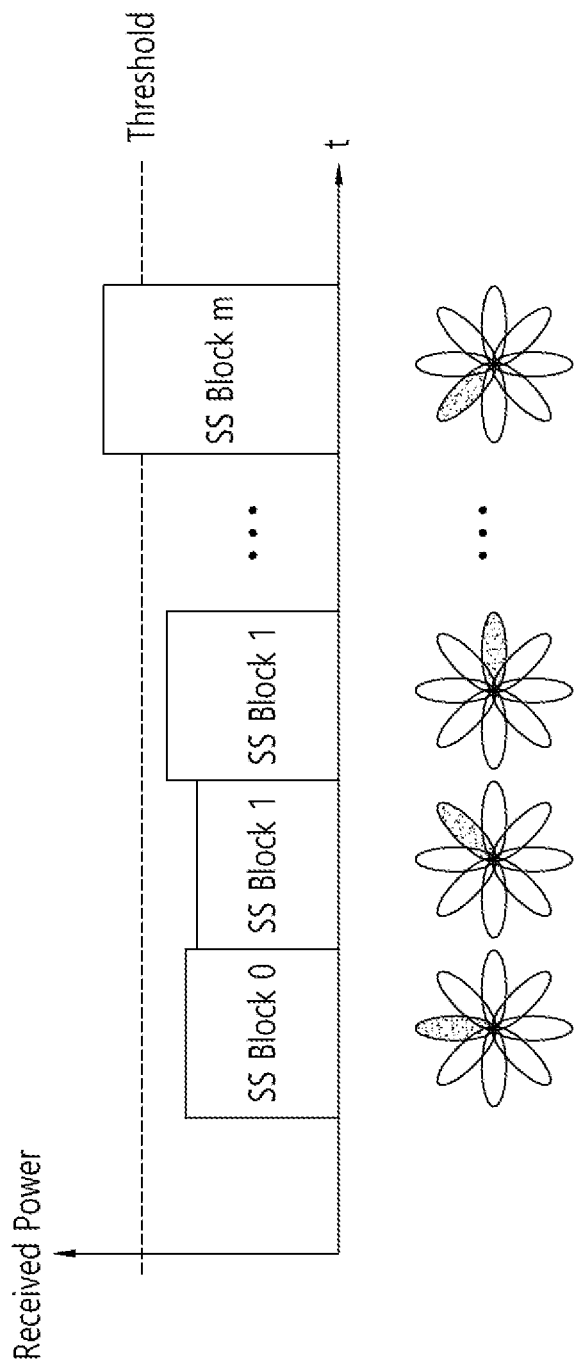
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, up to 400 megahertz (MHz) per component carrier (CC) may be supported. If a terminal operating in such a wideband CC always operates with RF for all CCs turned on, battery consumption of the terminal may increase. Or when considering multiple use cases (e.g. eMBB, URLLC, mMTC, etc.) operating within one broadband CC, different numerologies (e.g., sub-carrier spacing (SCS)) may be supported for each frequency band within a corresponding CC. Alternatively, the capability for the maximum bandwidth may be different for each terminal. Considering this, the base station may instruct the terminal to operate only in a part of the bandwidth rather than the entire bandwidth of the wideband CC, for convenience, the corresponding partial bandwidth is defined as a bandwidth part (BWP). BWP may be composed of consecutive resource blocks (RBs) on the frequency axis, it may correspond to one numerology (e.g., subcarrier spacing, cyclic prefix (CP) length, slot/mini-slot duration, etc.).

Meanwhile, the base station may set multiple BWPs even within one CC configured for the terminal. For example, in a PDCCH monitoring slot, a BWP that occupies a relatively small frequency domain is set, the PDSCH indicated by the PDCCH may be scheduled on a larger BWP. Alternatively, when terminals are concentrated in a specific BWP, some terminals may be set to other BWPs for load balancing. Alternatively, in consideration of frequency domain inter-cell interference cancellation between neighboring cells, a part of the spectrum in the middle of the entire bandwidth may be excluded and both BWPs may be configured even within the same slot. That is, the base station may set at least one DL/UL BWP to a terminal associated with a wideband CC, at least one DL/UL BWP among the DL/UL BWP (s) configured at a specific time point can be activated (by L1 signaling or MAC CE or RRC signaling, etc.), switching to another set DL/UL BWP may be indicated (by L1 signaling or MAC CE or RRC signaling, etc.), when the timer value expires on a timer basis, it may be switched to a predetermined DL/UL BWP. At this time, the activated DL/UL BWP is defined as an active DL/UL BWP. However, in situations such as when the terminal is in the initial access process or before the RRC connection is set up, this may not receive settings for DL/UL BWP, in this situation, the DL/UL BWP assumed by the UE is defined as an initial active DL/UL BWP.

<DRX (Discontinuous Reception)>

Discontinuous Reception (DRX) means an operation mode in which a user equipment (UE) reduces battery consumption so that the terminal can discontinuously receive a downlink channel. That is, a UE set to DRX can reduce power consumption by discontinuously receiving DL signals.

The DRX operation is performed within a DRX cycle representing a time interval at which an On Duration is periodically repeated. The DRX cycle includes an on-period and a sleep duration (or DRX opportunity). The on-period indicates a time interval during which the UE monitors the PDCCH to receive the PDCCH.

DRX can be performed in Radio Resource Control (RRC)_IDLE state (or mode), RRC_INACTIVE state (or mode) or RRC_CONNECTED state (or mode). In RRC_IDLE state and RRC_INACTIVE state, DRX can be used to receive paging signals discontinuously.

RRC_IDLE state: A state in which a radio connection (RRC connection) between the base station and the terminal is not established.

RRC_INACTIVE state: A radio connection (RRC connection) is established between the base station and the terminal, but the radio connection is inactive.

RRC_CONNECTED state: A state in which a radio connection (RRC connection) is established between the base station and the terminal.

DRX can be basically divided into idle mode DRX, connected DRX (C-DRX), and extended DRX.

DRX applied in the IDLE state may be referred to as idle mode DRX, and DRX applied in the CONNECTED state may be referred to as connected mode DRX (C-DRX).

Extended/Enhanced DRX (eDRX) is a mechanism that can extend the cycles of idle mode DRX and C-DRX. Extended/Enhanced DRX (eDRX) can be mainly used for (massive) IoT applications. In idle mode DRX, whether to allow eDRX may be set based on system information (e.g., SIB1). SIB1 may include eDRX-allowed parameters. The eDRX-allowed parameter is a parameter indicating whether idle mode extended DRX is allowed.

<Idle Mode DRX>

In idle mode, the UE can use DRX to reduce power consumption. One paging occasion (PO) is a subframe that can be transmitted through the Paging-Radio Network Temporary Identifier (P-RNTI) (addresses paging messages for NB-IoT) Physical Downlink Control Channel (PDCCH) or MTC PDCCH (MPDCCH) or Narrowband PDCCH (NPDCCH).

In the P-RNTI transmitted through MPDCCH, PO may indicate the start subframe of MPDCCH repetition. In the case of P-RNTI transmitted over NPDCCH, if the subframe determined by the PO is not a valid NB-IoT downlink subframe, the PO may indicate the start subframe of the NPDCCH repetition. Therefore, the first effective NB-IoT downlink subframe after PO is the starting subframe of NPDCCH repetition.

One paging frame (PF) is one radio frame that may include one or multiple paging opportunities. When DRX is used, the UE only needs to monitor one PO per DRX cycle. One paging narrow band (PNB) is one narrow band in which a terminal performs paging message reception. PF, PO, and PNB may be determined based on DRX parameters provided in system information.

Figure 19:
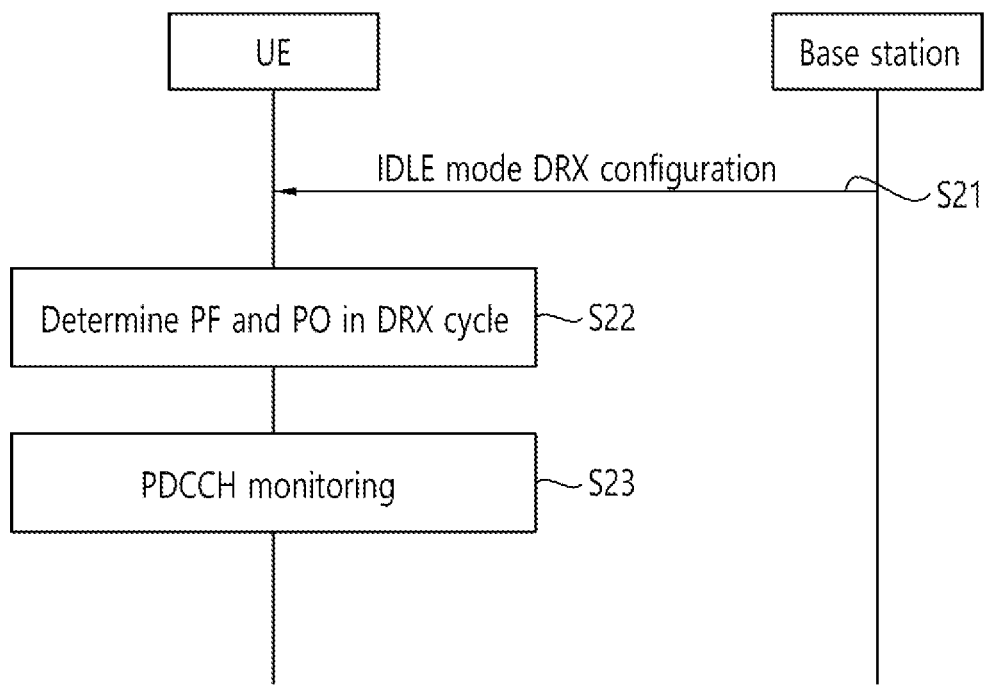
FIG. 19 is a flowchart illustrating an example of performing an idle mode DRX operation.

FIG. 19 is a flowchart illustrating an example of performing an idle mode DRX operation.

According to FIG. 19, the terminal may receive idle mode DRX configuration information from the base station through higher layer signaling (e.g., system information) (S21).

The UE may determine a Paging Frame (PF) and a Paging Occasion (PO) to monitor the PDCCH in the paging DRX cycle based on the idle mode DRX configuration information (S22). In this case, the DRX cycle may include an on-period and a sleep period (or DRX opportunity).

The UE may monitor the PDCCH in the PO of the determined PF (S23). Here, for example, the UE monitors only one subframe (PO) per paging DRX cycle. In addition, when the terminal receives the PDCCH scrambled by the P-RNTI during the on-duration (i.e., when paging is detected), the terminal transitions to the connected mode and can transmit and receive data with the base station.

<Connected Mode DRX(C-DRX)>

C-DRX means DRX applied in the RRC connection state. The DRX cycle of C-DRX may consist of a short DRX cycle and/or a long DRX cycle. Here, a short DRX cycle may correspond to an option.

When C-DRX is configured, the UE may perform PDCCH monitoring for the on-period. If the PDCCH is successfully detected during PDCCH monitoring, the terminal may operate (or execute) an inactive timer and maintain an awake state. Conversely, if the PDCCH is not successfully detected during PDCCH monitoring, the UE may enter the sleep state after the on-interval ends.

When C-DRX is configured, PDCCH reception opportunities (e.g., slots having a PDCCH search space) may be configured non-contiguously based on C-DRX configuration. In contrast, if C-DRX is not configured, in the present disclosure, PDCCH reception opportunities (e.g., slots having a PDCCH search space) may be continuously configured.

Meanwhile, PDCCH monitoring may be limited to a time interval set as a measurement gap regardless of C-DRX configuration.

Figure 20:
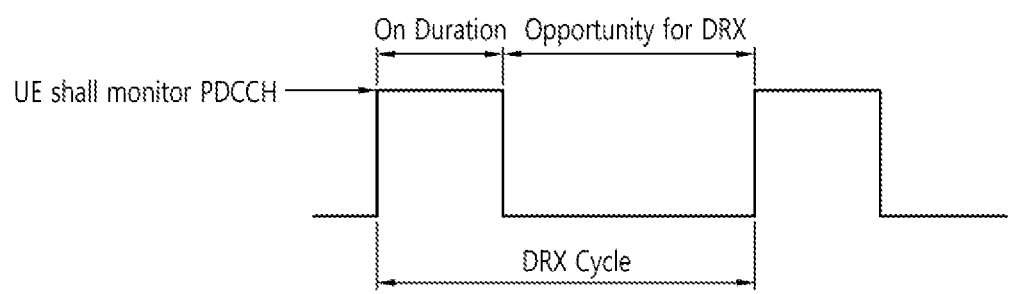
FIG. 20 illustrates a DRX cycle.

FIG. 20 illustrates a DRX cycle.

Referring to FIG. 20, the DRX cycle consists of 'On Duration' and 'Opportunity for DRX'. The DRX cycle defines the time interval at which the 'on-interval' is repeated periodically. 'On-interval' indicates a time interval monitored by the UE to receive the PDCCH. When DRX is configured, the UE performs PDCCH monitoring during 'on-period'. If there is a successfully detected PDCCH during PDCCH monitoring, the terminal operates an inactivity timer and maintains an awake state. On the other hand, if there is no PDCCH successfully detected during PDCCH monitoring, the UE enters a sleep state after the 'on-interval' ends. Therefore, when DRX is configured, PDCCH monitoring/reception may be performed discontinuously in the time domain in performing the procedure and/or method described/suggested above. For example, when DRX is configured, in the present disclosure, PDCCH reception opportunities (e.g., slots having a PDCCH search space) may be configured discontinuously according to DRX configuration. On the other hand, when DRX is not configured, PDCCH monitoring/reception may be continuously performed in the time domain in performing the procedure and/or method described/proposed above. For example, when DRX is not configured, in the present disclosure, PDCCH reception opportunities (e.g., slots having a PDCCH search space) may be continuously configured. Meanwhile, PDCCH monitoring may be limited in a time interval set as a measurement gap regardless of whether DRX is configured.

Table 6 shows the process of a UE related to DRX (RRC_CONNECTED state). Referring to Table 6, DRX configuration information is received through higher layer (e.g., RRC) signaling, and DRX ON/OFF is controlled by the DRX command of the MAC layer. When DRX is configured, PDCCH monitoring may be performed discontinuously in performing the procedures and/or methods described/suggested in this disclosure.

TABLE 6

|        | Type of signals | UE procedure |
|--------|-----------------|--------------|
| step 1 | RRC signaling(MAC-CellGroupConfig | Receive DRX setting information |
| step 2 | MAC CE((Long) DRX command MAC CE) | Receive DRX command |
| step 3 | — | PDCCH monitoring during the on-duration of the DRX cycle |

The MAC-CellGroupConfig may include configuration information required to set medium access control (MAC) parameters for a cell group. MAC-CellGroupConfig may also include DRX-related configuration information. For example, MAC-CellGroupConfig defines DRX and may include information as follows.

Value of drx-OnDurationTimer: defines the length of the start section of the DRX cycle
Value of drx-InactivityTimer: Defines the length of the time period in which the UE remains awake after a PDCCH opportunity in which a PDCCH indicating initial UL or DL data is detected
Value of drx-HARQ-RTT-TimerDL: Defines the length of the maximum time interval after DL initial transmission is received until DL retransmission is received.
Value of drx-HARQ-RTT-TimerDL: Defines the length of the maximum time interval after the grant for UL initial transmission is received until the grant for UL retransmission is received.
drx-LongCycleStartOffset: Defines the time length and starting point of the DRX cycle
drx-ShortCycle (optional): defines the time length of the short DRX cycle Here, if any one of drx-OnDurationTimer, drx-InactivityTimer, drx-HARQ-RTT-TimerDL, and drx-HARQ-RTT-TimerDL is in operation, the UE maintains an awake state and performs PDCCH monitoring at every PDCCH opportunity.

Hereinafter, a 5G system or a 6G system will be described.

The 6G system is aimed at (i) very high data rates per device, (ii) a very large number of connected devices, (iii) global connectivity, (iv) very low latency, (v) lower energy consumption of battery-free IoT devices, (vi) an ultra-reliable connection, (vii) connected intelligence with machine learning capabilities, etc. The vision of 6G systems can be four aspects: intelligent connectivity, deep connectivity, holographic connectivity and ubiquitous connectivity, the 6G system can satisfy the requirements shown in Table 7 below. That is, Table 7 is a table showing an example of requirements for a 6G system.

TABLE 7

| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

6G system can have Enhanced mobile broadband (eMBB), Ultra-reliable low latency communications (URLLC), massive machine-type communication (mMTC), AI integrated communication, Tactile internet, High throughput, High network capacity, High energy efficiency, Low backhaul and access network congestion, and Key factors such as enhanced data security.

Figure 21:
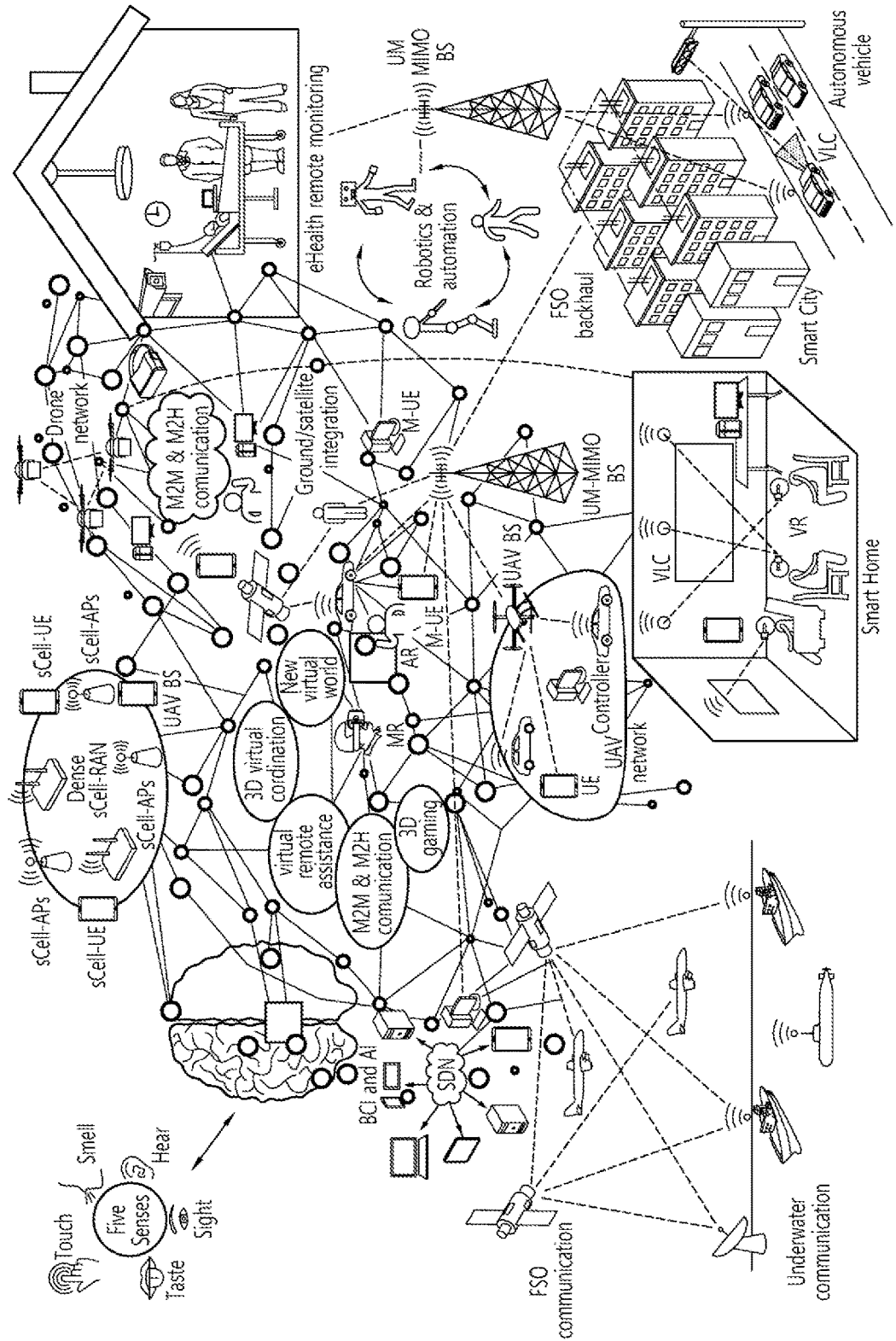
FIG. 21 shows an example of a communication structure that can be provided in a 6G system.

FIG. 21 shows an example of a communication structure that can be provided in a 6G system.

The 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.
Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.
Seamless integration of wireless information and energy transfer: A 6G wireless network may transfer power in order to charge the batteries of devices such as smartphones and sensors. Therefore, wireless information and energy transfer (WIET) will be integrated.
Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Hereinafter, artificial intelligence (AI) among the core implementation technologies of the 6G system will be described.

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 22:
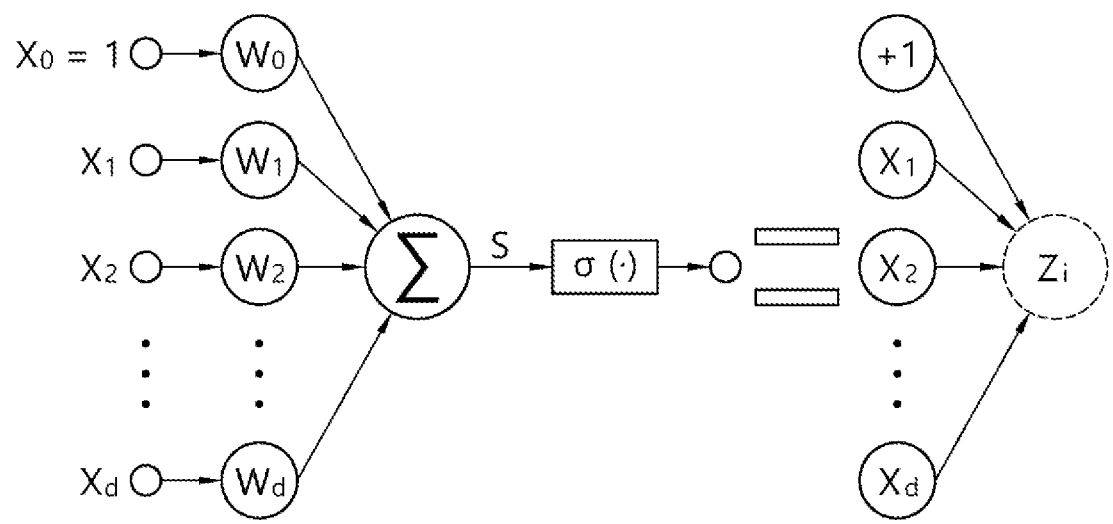
FIG. 22 shows an example of a perceptron structure.

FIG. 22 shows an example of a perceptron structure.

Referring to FIG. 22, if the input vector $x=(x1, x2, \ldots, xd)$ is input, each component is multiplied by the weight (W1, W2, ..., Wd), after summing up all the results, applying the activation function $\sigma(\cdot)$, the entire process above is called a perceptron. The huge artificial neural network structure may extend the simplified perceptron structure shown in FIG. 22 and apply input vectors to different multi-dimensional perceptrons. For convenience of description, an input value or an output value is referred to as a node.

Meanwhile, the perceptron structure shown in FIG. 22 can be described as being composed of a total of three layers based on input values and output values. An artificial neural network in which H number of (d+1) dimensional perceptrons exist between the 1st layer and the 2nd layer and K number of (H+1) dimensional perceptrons between the 2nd layer and the 3rd layer can be expressed as shown in FIG. 23.

Figure 23:
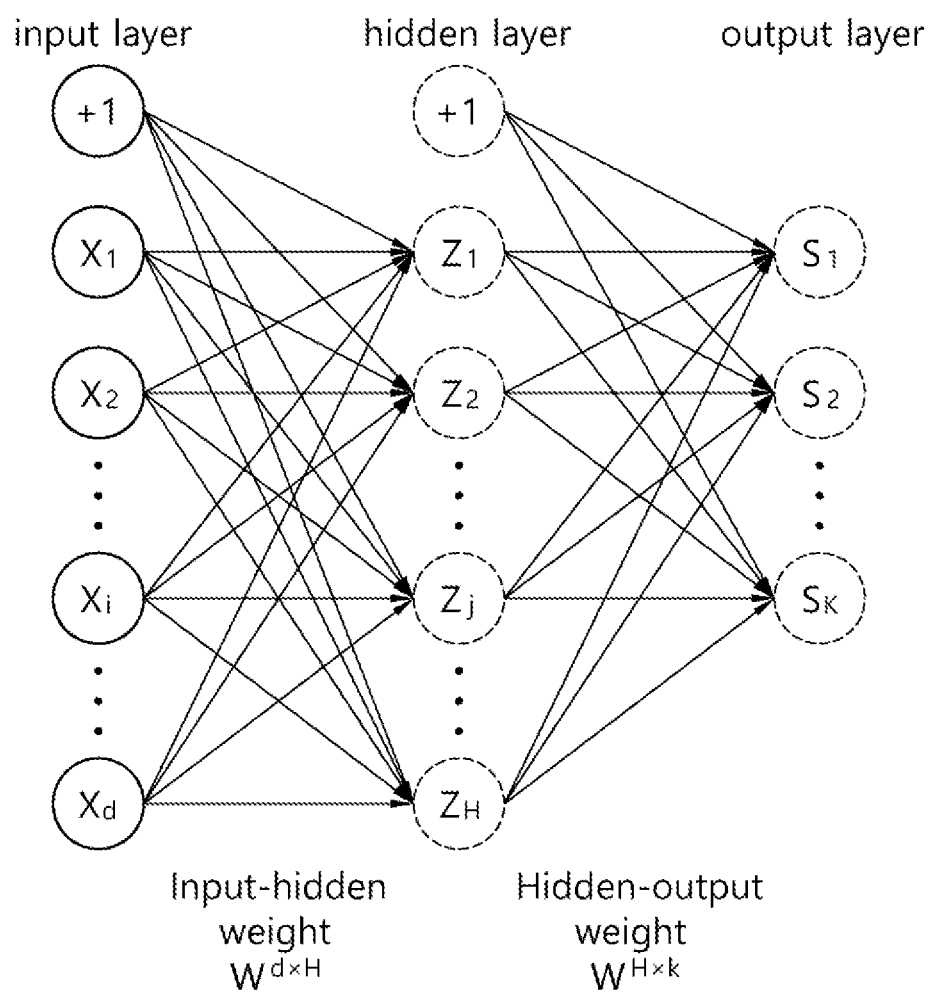
FIG. 23 shows an example of a multi-perceptron structure.

FIG. 23 shows an example of a multi-perceptron structure.

The layer where the input vector is located is called the input layer, the layer where the final output value is located is called the output layer, and all the layers located between the input layer and the output layer are called hidden layers. In the example of FIG. 23, three layers are disclosed, but when counting the number of layers of an actual artificial neural network, since the count excludes the input layer, it can be regarded as a total of two layers. The artificial neural network is composed of two-dimensionally connected perceptrons of basic blocks.

The above-described input layer, hidden layer, and output layer can be jointly applied to various artificial neural network structures such as CNN and RNN, which will be described later, as well as multi-layer perceptrons. As the number of hidden layers increases, the artificial neural network becomes deeper, and a machine learning paradigm that uses a sufficiently deep artificial neural network as a learning model is called deep learning. In addition, the artificial neural network used for deep learning is called a deep neural network (DNN).

Figure 24:
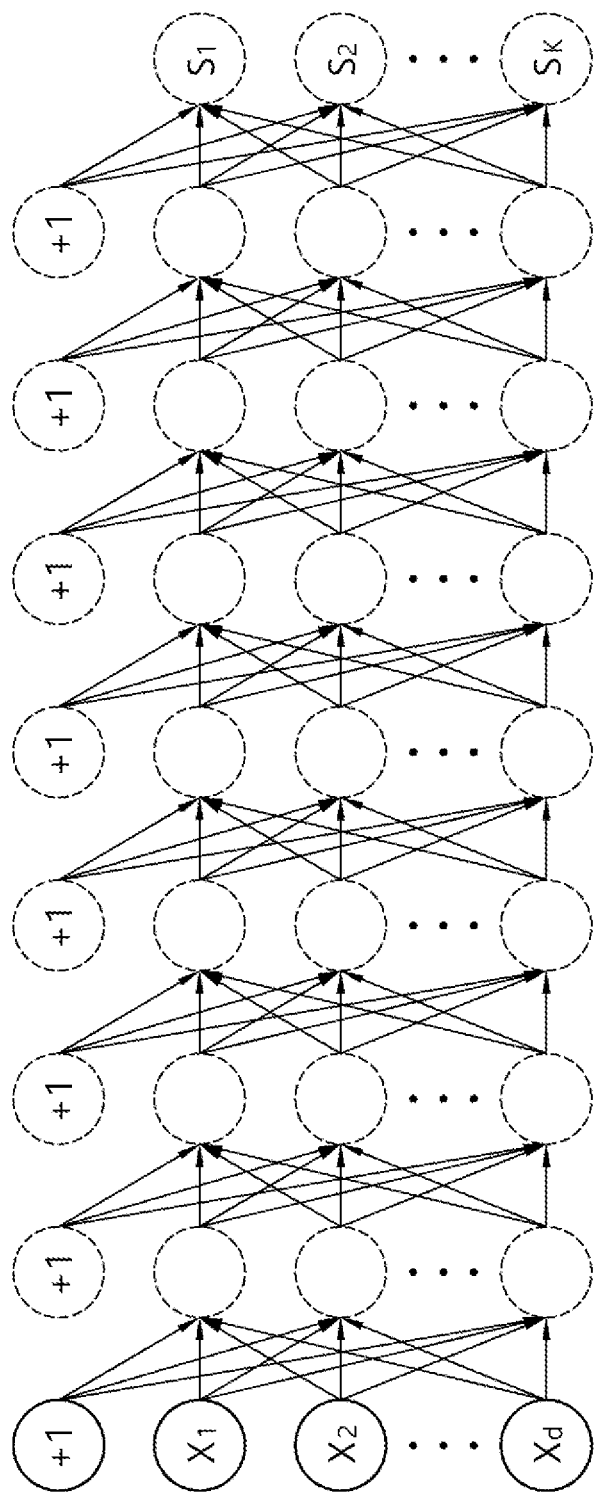
FIG. 24 shows an example of a deep neural network.

FIG. 24 shows an example of a deep neural network.

The deep neural network shown in FIG. 24 is a multi-layer perceptron consisting of 8 hidden layers+8 output layers. The multilayer perceptron structure is expressed as a fully-connected neural network. In a fully-connected neural network, there is no connection relationship between nodes located on the same layer, and there is a connection relationship only between nodes located on adjacent layers. DNN has a fully connected neural network structure and is composed of a combination of multiple hidden layers and activation functions, so it can be usefully applied to identify the correlation characteristics between inputs and outputs. Here, the correlation characteristic may mean a joint probability of input and output.

On the other hand, depending on how a plurality of perceptrons are connected to each other, various artificial neural network structures different from the aforementioned DNN can be formed.

Figure 25:
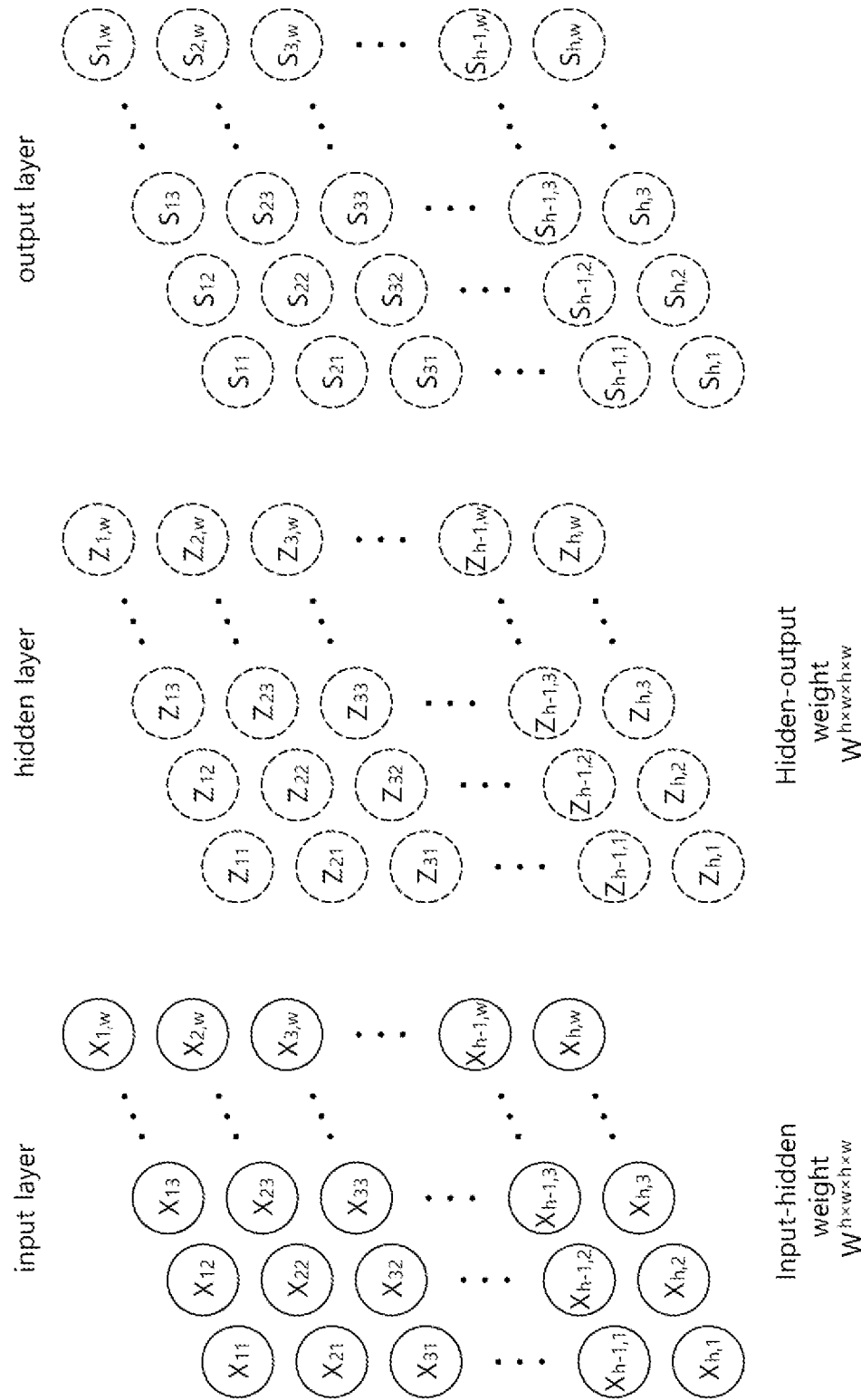
FIG. 25 shows an example of a convolutional neural network.

FIG. 25 shows an example of a convolutional neural network.

In DNN, nodes located inside one layer are arranged in a one-dimensional vertical direction. However, in FIG. 25, it can be assumed that the nodes are two-dimensionally arranged with w nodes horizontally and h nodes vertically (convolutional neural network structure of FIG. 25). In this case, since a weight is added for each connection in the connection process from one input node to the hidden layer, a total of h×w weights must be considered. Since there are h×w nodes in the input layer, a total of h2w2 weights are required between two adjacent layers.

Figure 26:
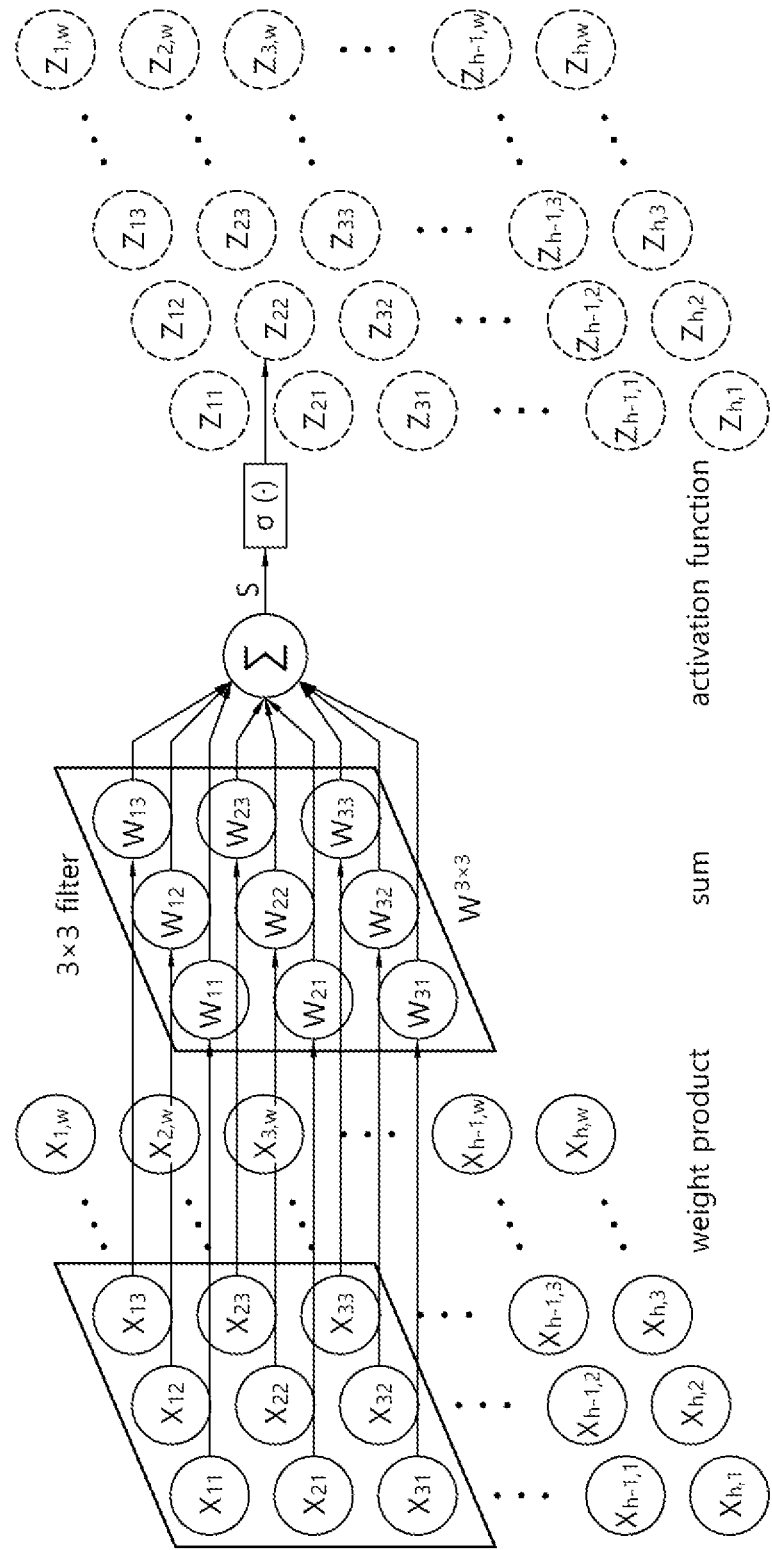
FIG. 26 shows an example of a filter operation in a convolutional neural network.

FIG. 26 shows an example of a filter operation in a convolutional neural network.

The convolutional neural network of FIG. 25 has a problem that the number of weights increases exponentially according to the number of connections, so instead of considering all mode connections between adjacent layers, assuming that a filter having a small size exists, as shown in FIG. 26, a weighted sum and an activation function operation are performed on a portion where the filters overlap.

One filter has weights corresponding to the number of filters, and learning of weights can be performed so that a specific feature on an image can be extracted as a factor and output. In FIG. 26, a 3×3 size filter is applied to the 3×3 area at the top left of the input layer, and the weighted sum and activation function calculations are performed on the corresponding node, and the resulting output value is stored in z22.

The filter scans the input layer while moving horizontally and vertically at regular intervals, performs weighted sum and activation function calculations, and places the output value at the position of the current filter. This operation method is similar to the convolution operation for images in the field of computer vision, so the deep neural network of this structure is called a convolutional neural network (CNN), a hidden layer generated as a result of the convolution operation is called a convolutional layer. Also, a neural network having a plurality of convolutional layers is referred to as a deep convolutional neural network (DCNN).

In the convolution layer, the number of weights may be reduced by calculating a weighted sum by including only nodes located in a region covered by the filter in the node where the current filter is located. This allows one filter to be used to focus on features for a local area. Accordingly, CNN can be effectively applied to image data processing in which a physical distance in a 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data attributes. Considering the length variability and precedence relationship of these sequence data, input one element on the data sequence at each time step, a structure in which an output vector (hidden vector) of a hidden layer output at a specific point in time is input together with the next element in a sequence to an artificial neural network is called a recurrent neural network structure.

Figure 27:
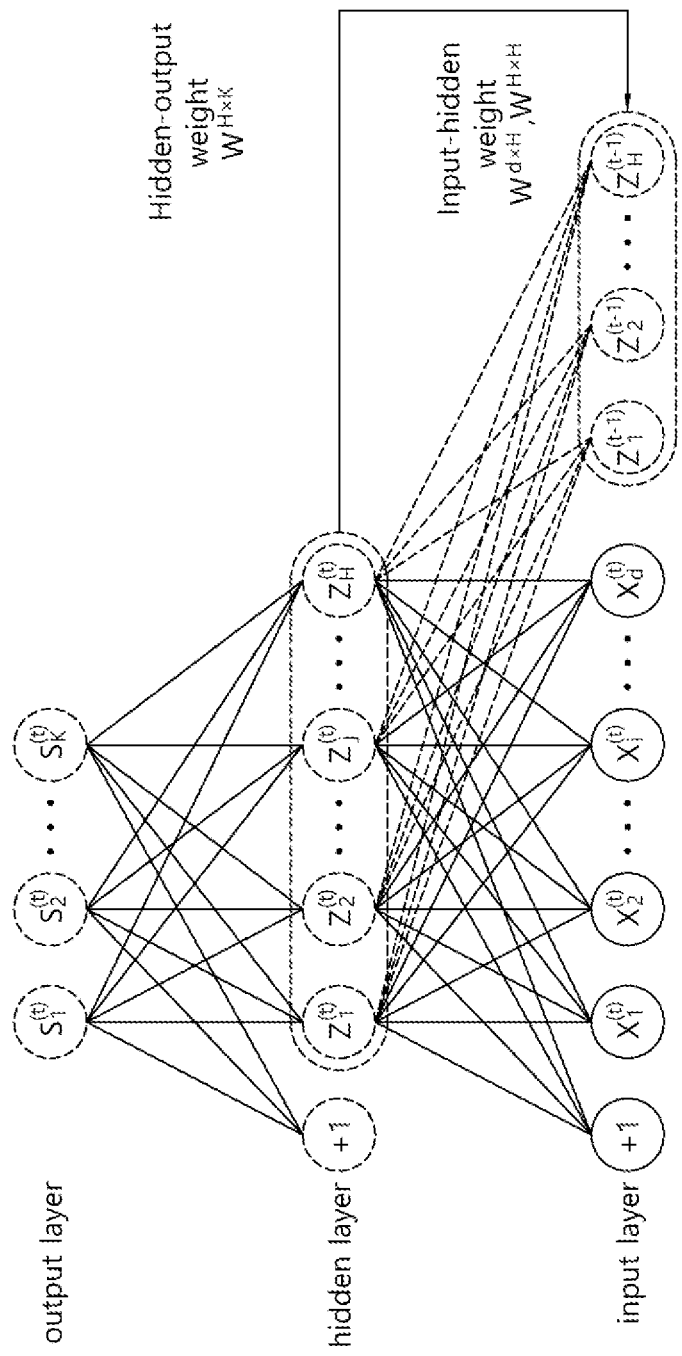
FIG. 27 shows an example of a neural network structure in which a cyclic loop exists.

FIG. 27 shows an example of a neural network structure in which a cyclic loop exists.

Referring to FIG. 27, a recurrent neural network (RNN) is a structure that applies a weighted sum and an activation function in the process of inputting an element (x1(t), x2(t), . . . xd(t)) of any gaze t on the data sequence to the fully connected neural network, by entering together the hidden vector (z1(t−1), z2(t−1), . . . , zH(t−1)) of the immediately preceding time point t−1. The reason why the hidden vector is transmitted to the next time point in this way is that information in the input vector at previous time points is regarded as being accumulated in the hidden vector of the current time point.

Referring to FIG. 27, the recurrent neural network operates in a sequence of predetermined views with respect to an input data sequence.

The hidden vectors (z1(1), z2(1), . . . , zH(1)) when the input vectors (x1(t), x2(t), . . . , xd(t)) at time point 1 are input to the recurrent neural network is input together with the input vector (x1(2), x2(2), . . . , xd(2)) of time point 2, the vector (z1(2), z2(2), . . . , zH(2)) of the hidden layer is determined through the weighted sum and activation function. This process is repeatedly performed until time point 2, point 3, . . . , point T.

Meanwhile, when a plurality of hidden layers are arranged in a recurrent neural network, it is referred to as a deep recurrent neural network (DRNN). Recurrent neural networks are designed to be usefully applied to sequence data (e.g., natural language processing).

As a neural network core used as a learning method, in addition to DNN, CNN, and RNN, various deep learning techniques such as Restricted Boltzmann Machine (RBM), deep belief networks (DBN), and deep Q-Network may be included. It can be applied to fields such as computer vision, voice recognition, natural language processing, and voice/signal processing.

Hereinafter, Terahertz (THz) communication among core implementation technologies of the 6G system will be described.

A data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RE.

Figure 28:
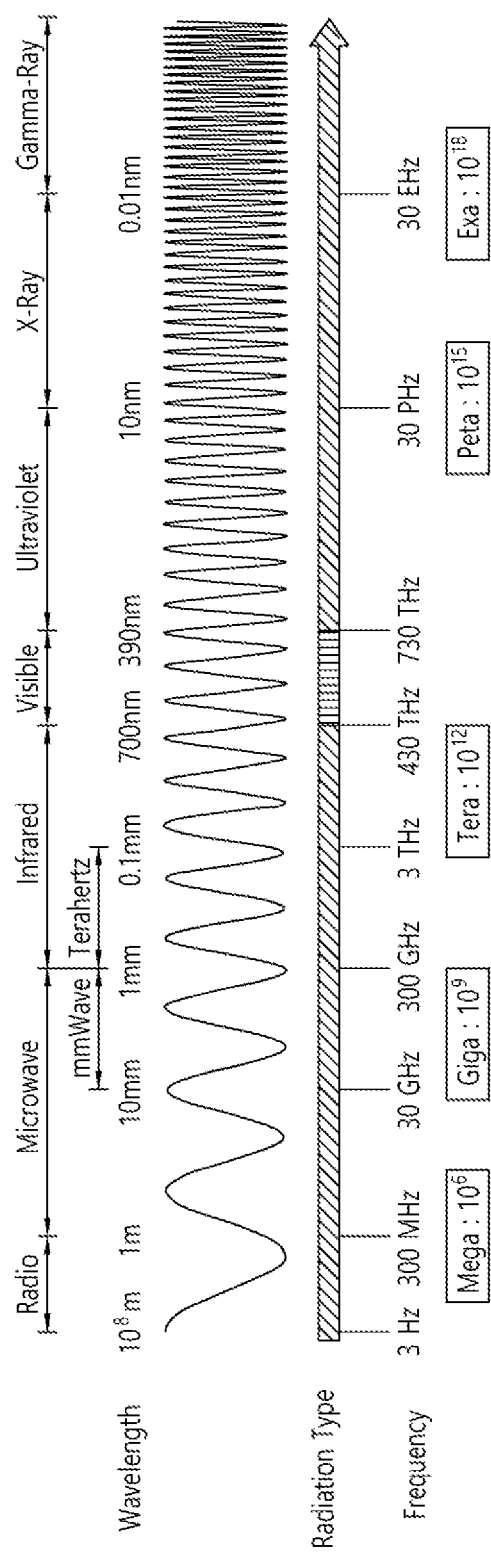
FIG. 28 shows an example of an electromagnetic spectrum.

FIG. 28 shows an example of an electromagnetic spectrum.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz wireless communication uses a THz wave having a frequency of approximately 0.1 to 10 THz (1 THz=$10^{12}$ Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 29:
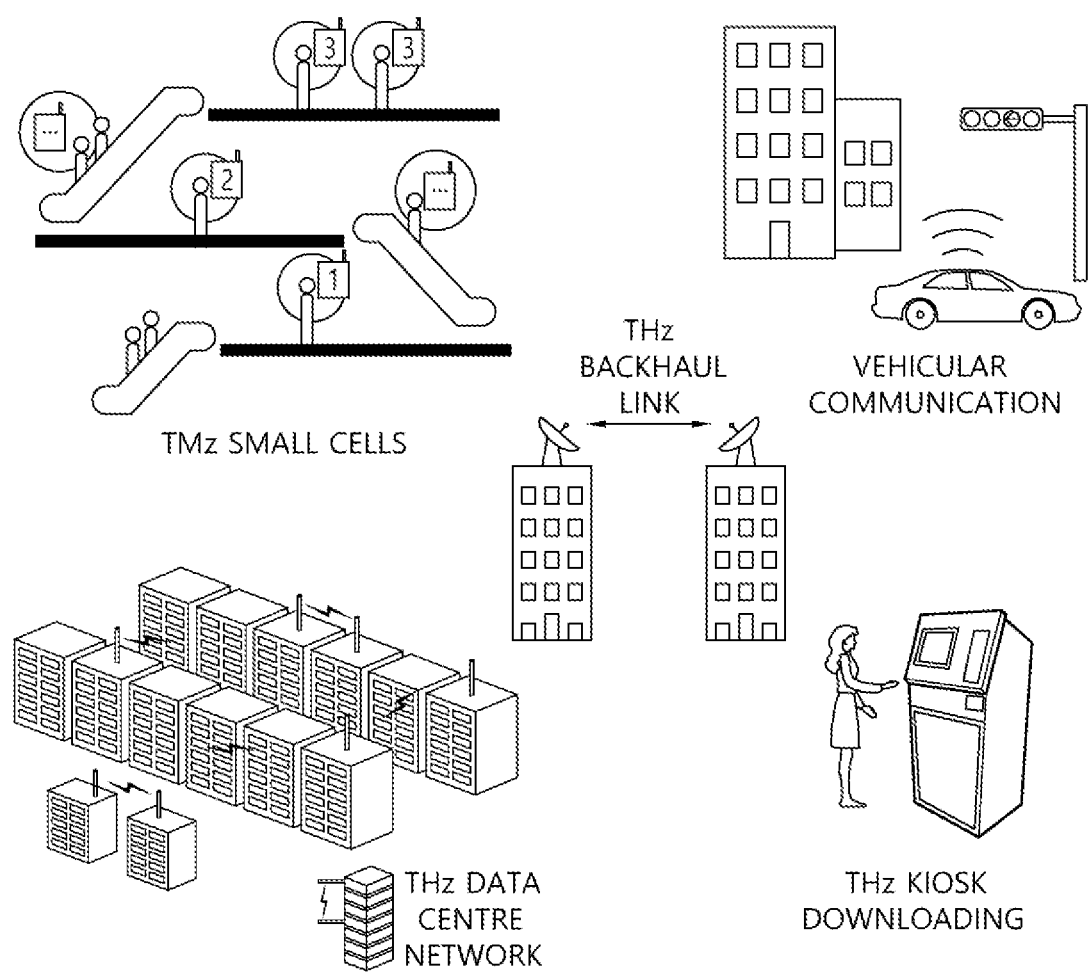
FIG. 29 is a diagram showing an example of a THz communication application.

FIG. 29 is a diagram showing an example of a THz communication application.

As shown in FIG. 29, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 8 is a table showing an example of a technology that can be used in a THz wave.

TABLE 8

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Meanwhile, THz wireless communication can be classified based on the method for generating and receiving THz. The THz generation method can be classified as an optical device or an electronic device based technology.

Figure 30:
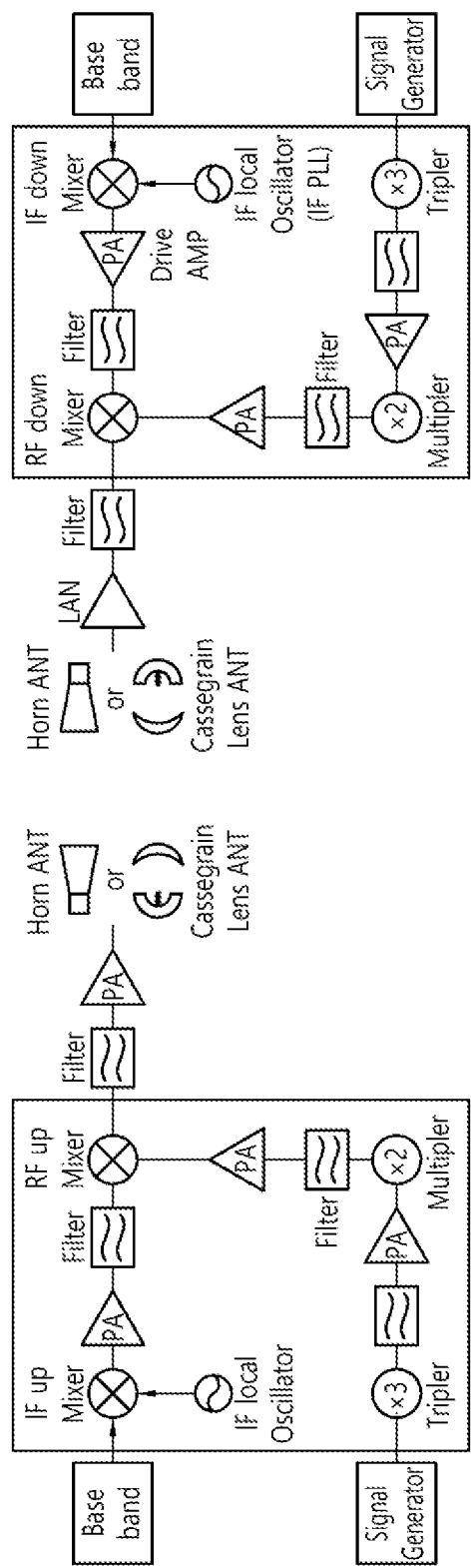
FIG. 30 illustrates an example of an electronic element-based THz wireless communication transceiver.

FIG. 30 illustrates an example of an electronic element-based THz wireless communication transceiver.

the method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 30, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 30. In FIG. 30, IF represents an intermediate frequency, a tripler and a multiplier represents a multiplier, PA represents a power amplifier, and LNA represents a low noise amplifier, and PLL represents a phase-locked loop.

Figure 31:
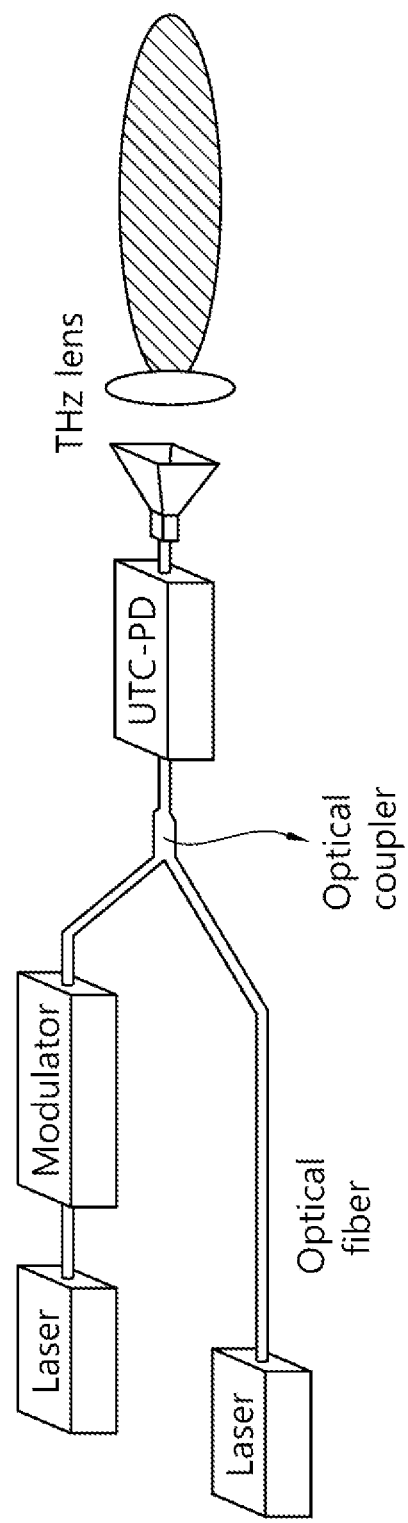
FIG. 31 illustrates an example of a method of generating a THz signal based on an optical element.
Figure 32:
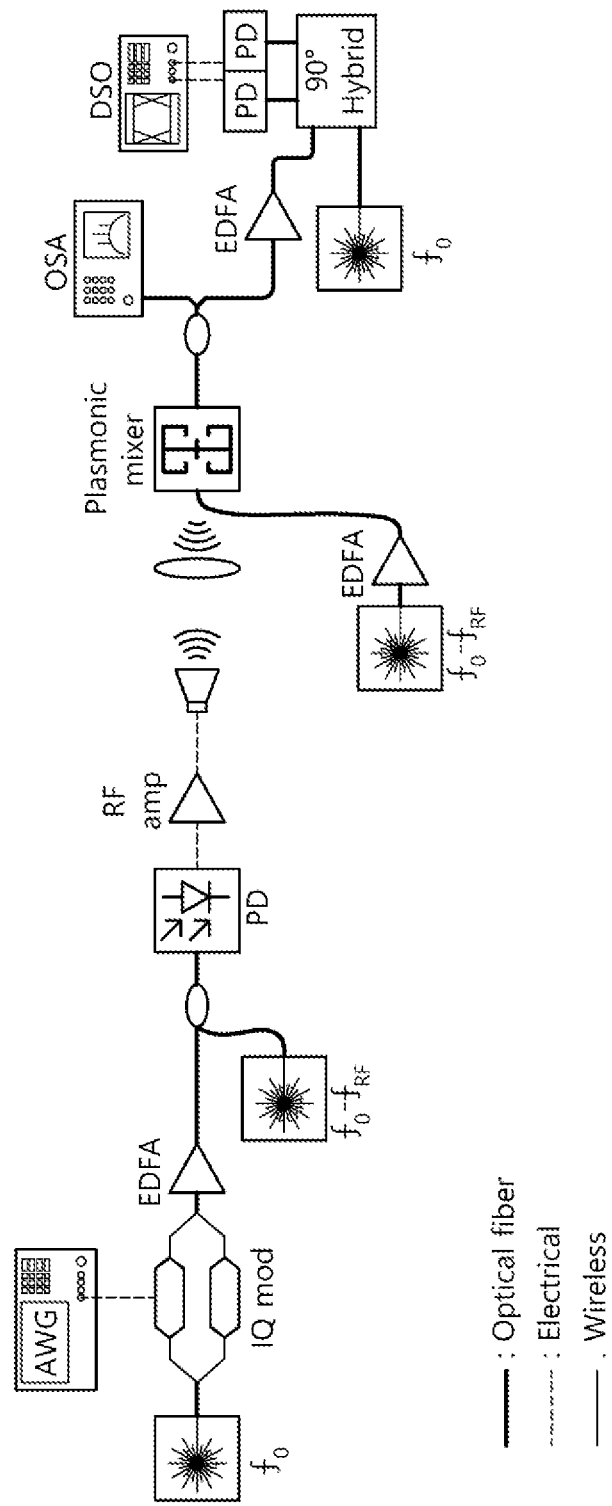
FIG. 32 shows an example of an optical element-based THz wireless communication transceiver.

FIG. 31 illustrates an example of a method of generating a THz signal based on an optical element. FIG. 32 shows an example of an optical element-based THz wireless communication transceiver.

The optical device-based THz wireless communication technology means a method of generating and modulating a THz signal using an optical device. The optical device-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 31, a laser diode, a broadband optical modulator, and an ultrahigh-speed photodetector are required. In the case of FIG. 31, the light signals of two lasers having different wavelengths are combined to generate a THz signal corresponding to a wavelength difference between the lasers. In FIG. 31, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 32, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 33:
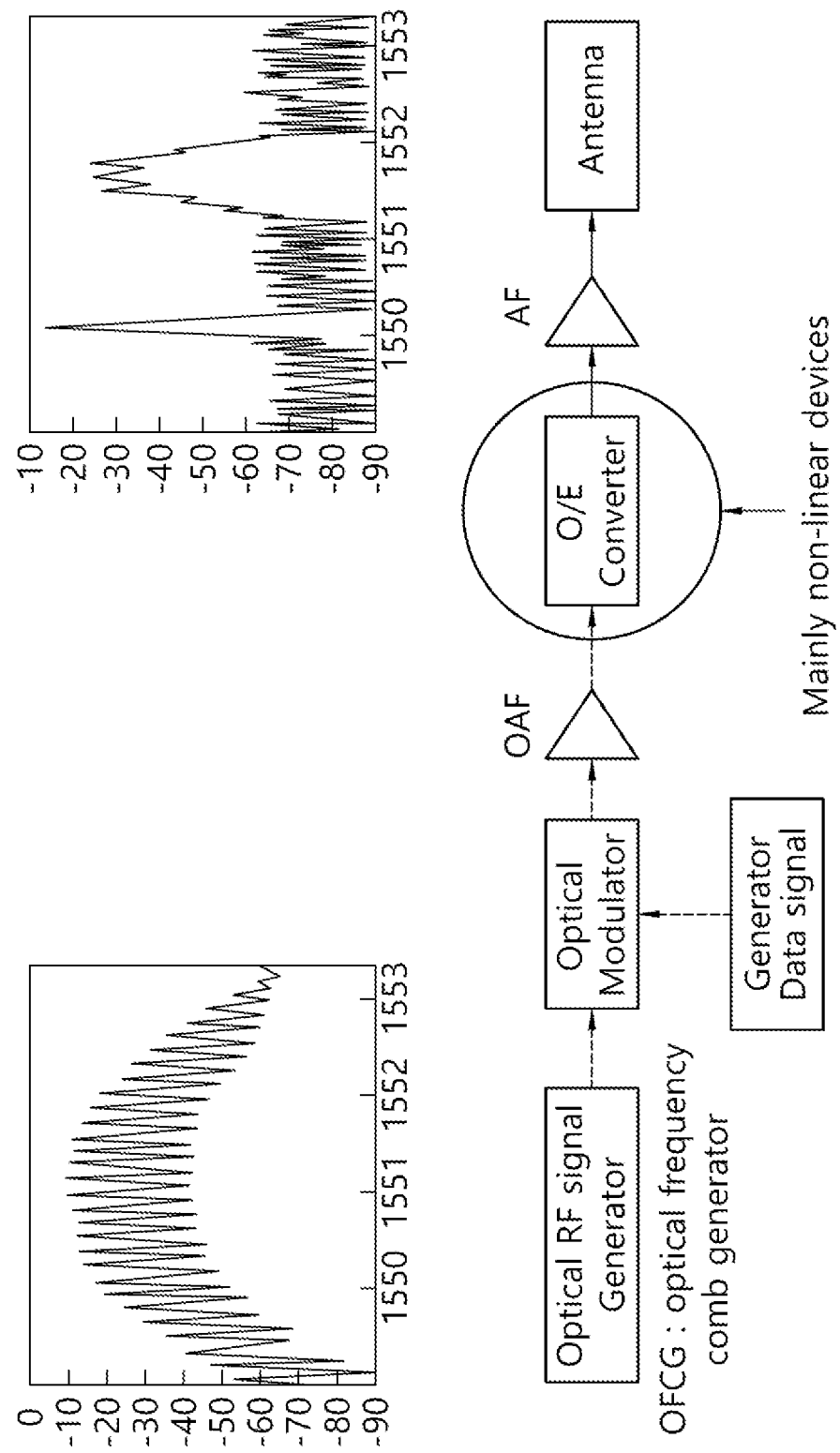
FIG. 33 illustrates the structure of a photonic source based transmitter.
Figure 34:
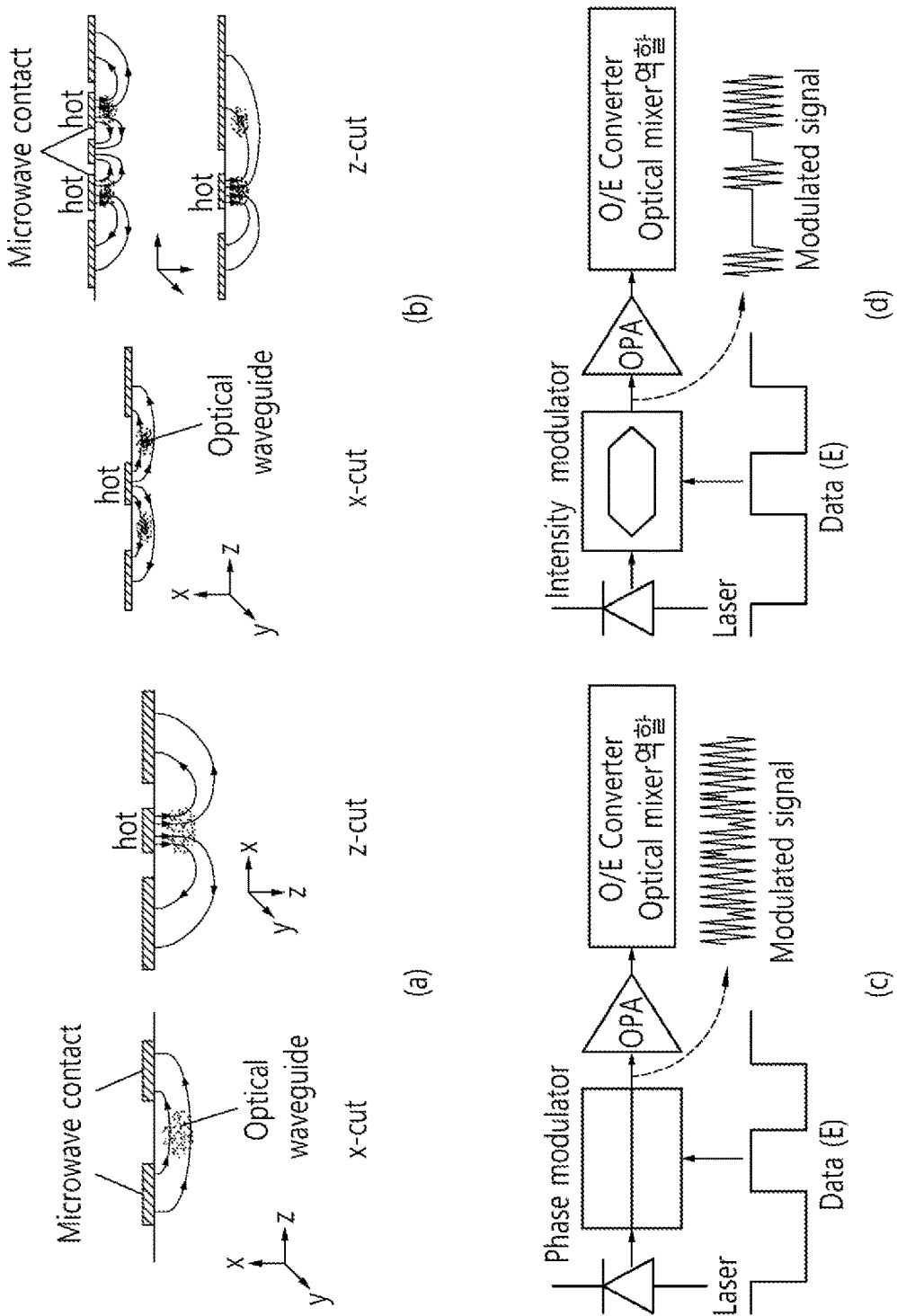
FIG. 34 illustrates the structure of an optical modulator.

The structure of the photoelectric converter (or photoelectric converter) will be described with reference to FIGS. 33 and 34. FIG. 33 illustrates the structure of a photonic source based transmitter. FIG. 34 illustrates the structure of an optical modulator.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Meanwhile, the development direction of wireless communication technology has been focused on increasing data transmission rate by utilizing wide bandwidth (BW) and multiple input multiple output (MIMO) technology. It is expected that higher frequencies will be used to secure a wider bandwidth in future next-generation wireless communications. For example, Beyond 5G or 6G worldwide is researching communication transmission and reception technology in the high frequency band from 0.1 THz to 10 THz. In addition, as the carrier frequency increases, the free space path loss (FSPL) value physically increases. Therefore, in order to overcome this, the transceiver must derive a gain through beamforming technology by mounting a large number of transmit/receive antennas.

As described above, in a next-generation wireless communication system, a transceiver supporting a wide bandwidth and supporting a large number of antennas is required. However, in this case, in order to support a high data rate, the front-end of the transceiver must also support the corresponding data rate. In particular, at the receiving end, an analog-to-digital converter (ADC) also requires a high resolution and a high sampling rate.

It is obvious that an ADC supporting a high resolution and a high sampling rate accompanies a lot of power consumption. For example, current high-performance ADCs consume several Watts of power. In addition, in order to utilize multiple antennas, an RF chain is required for each antenna and a plurality of ADCs are required. In this case, tens to hundreds of watts of power will be required.

The power requirement means a much larger amount of power than the battery capacity currently used in the wireless device, especially from the point of view of reception, if power consumption of other hardware including ADC is added, it may act as a bottleneck in transmission/reception technology.

In order to solve the above problem, two solutions considering energy efficiency can be considered. The first is to construct an RF chain that includes a much smaller number of high-performance ADCs than the number of actual physical antennas, a hybrid beamforming method combining analog beamforming and digital beamforming by connecting multiple antennas to each single RF chain may be considered. The method has the advantage of reducing power consumption by using fewer ADCs than the number of physical antennas. On the other hand, analog beamforming has a low degree of freedom in beamforming, and a procedure for matching reception analog beamforming causes overhead.

The second is to connect low-power RF chains to all physical antennas. In particular, in the case of an ADC, power consumption can be reduced exponentially by configuring a 1-bit comparator. In addition, there is an advantage of operating without automatic gain control (AGC). On the other hand, loss in terms of received signal information due to 1-bit quantization occurs, and linear system modeling in terms of transmit and receive signals no longer fits, and thus a new transmission and reception technique is required.

Here, it is obvious that a new technique for estimating the existing AoA and AoD is required due to the information loss.

To this end, a receiving device having a 1-bit ADC for energy-efficient reception may be considered. At this time, information loss may occur as the signal sent by the transmitter passes through the 1-bit ADC.

Figure 35:
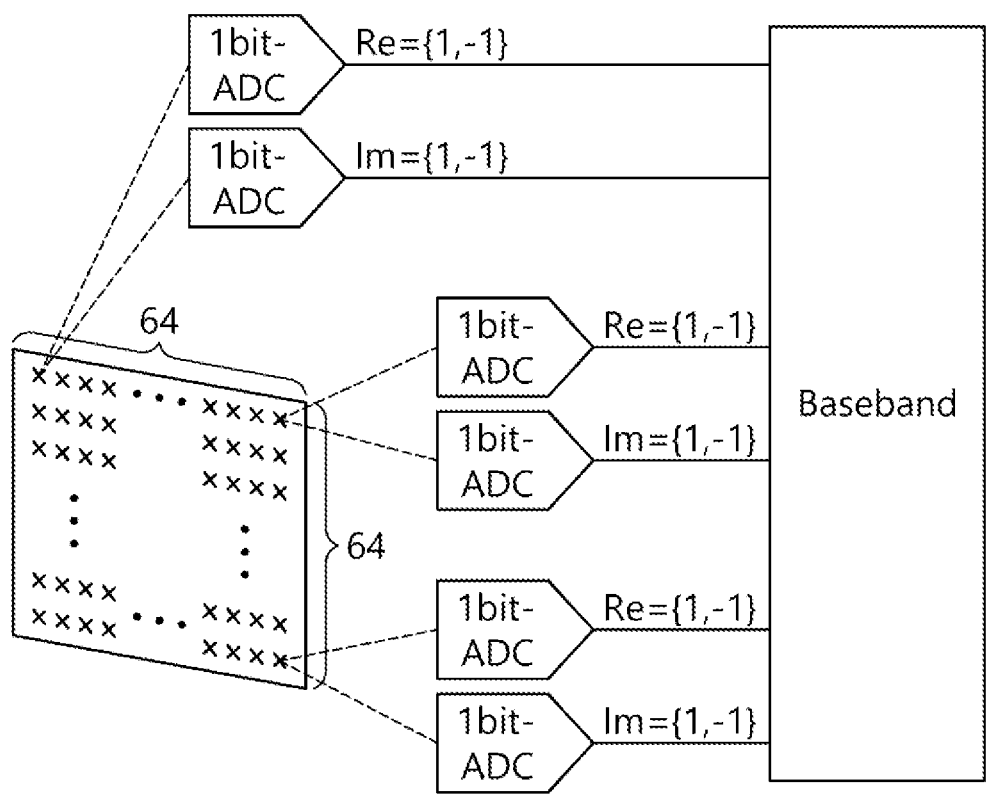
FIG. 35 shows an example of a receiving device having a 64*64 2D patch antenna and a 1-bit ADC.

FIG. 35 shows an example of a receiving device having a 64*64 2D patch antenna and a 1-bit ADC.

Specifically, FIG. 35 shows an example of a receiving device of having 4096 (64*64) antennas and the receiving path connected to each antenna having an I (in-phase) signal, that is, a real signal, and a Q (Quadrature) signal, that is, an imaginary signal, each having a 1-bit ADC. The RF front-end in front of the ADC is omitted.

Figure 36:
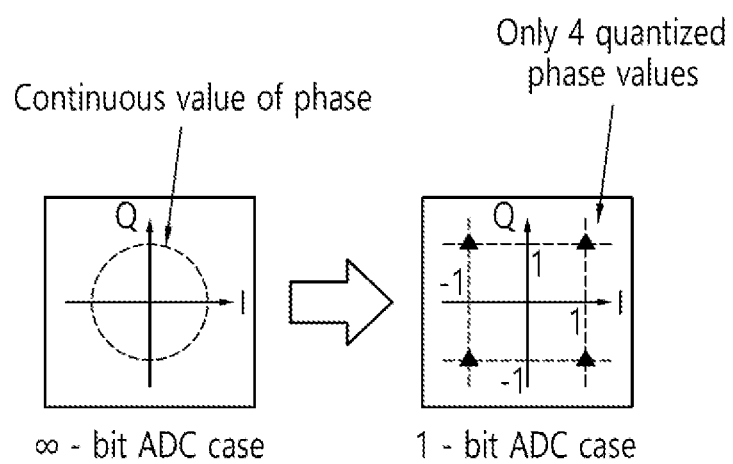
FIG. 36 schematically illustrates an example of a signal transmitted to baseband by a 1-bit ADC.

FIG. 36 schematically illustrates an example of a signal transmitted to baseband by a 1-bit ADC.

Here, in the conventional high-performance ADC, the received signal in the form of a +bj (a and b are numbers represented by 8 to 10 bits, respectively) is transmitted to the baseband, the types of signals transmitted to baseband by a 1-bit ADC are limited to four per receive path. That is, it is limited to 1+j, 1−j, −1+j, and −1+j.

Therefore, in the case of AoA and AoD, which were estimated through conventional phase estimation, such as phase estimation in the frequency domain, performance degradation inevitably occurs. This leads to deterioration of performance of localization and beam search. Therefore, a new technique is needed to enhance the performance of AoA and AoD in 1-bit ADC systems.

In the following, the proposal of the present disclosure will be described in more detail.

The following drawings are made to explain a specific example of the present specification. Since the names of specific devices or names of specific signals/messages/fields described in the drawings are provided as examples, the technical features of the present specification are not limited to the specific names used in the drawings below.

Figure 37:
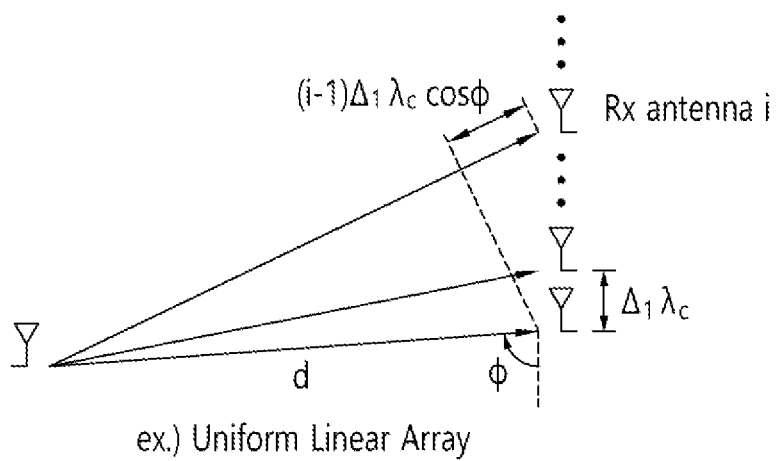
FIG. 37 shows an example of a Uniform Linear Array (ULA) of antennas.

FIG. 37 shows an example of a Uniform Linear Array (ULA) of antennas.

Referring to FIG. 37, in general, the physical distance between antennas can be divided as follows based on half of a wavelength of a transmission frequency. That is, if the distance between the antennas is less than ½ of the wavelength, it is called densely spaced or densely spaced. This is called spatially oversampling. In addition, the case of ½ is referred to as critically spaced or critically spaced, and is referred to as Nyquist sampling. A case greater than ½ is called sparse placement or sparsely spaced and is termed spatially undersampled.

In this specification, the physical distance between the antennas is made smaller than half the length of the wavelength of the transmission frequency, a new method of estimating AoA and AoD based on oversampling in the spatial domain and a method of enhancing performance through a baseband algorithm with a distance between antennas of more than half of a wavelength are proposed.

Hereinafter, a method of estimating AoA and AoD based on oversampling in the spatial domain is proposed.

Figure 38:
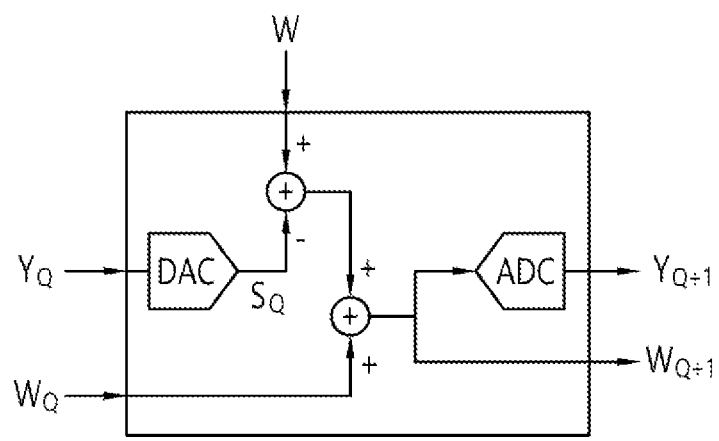
FIG. 38 is an example of a basic block diagram for explaining a delta-sigma structure in the spatial domain.

FIG. 38 is an example of a basic block diagram for explaining a delta-sigma structure in the spatial domain. Here, the delta-sigma structure may refer to a structure in which an error is obtained by predicting or estimating a signal value and then correcting the error using the accumulated error.

Referring to FIG. 38, if the $Y_{Q+1}$ signal is looped back to $Y_Q$ and the $W_{Q+1}$ signal is looped back to WQ, it can be referred to as a delta-sigma structure in the existing time domain. This can be expressed in the following way.

$$Y(z)=W(z)+(1-z^{-1})N(z) \quad \text{[Equation 1]}$$

That is, the actual quantized signal Y is composed of the sum of original signals W and N, that is, quantization errors. Here, 1−z−1 has a difference value of quantization error in the time domain, this part causes noise shaping, that is, a shaping effect of moving the quantization error of the low frequency part to the high frequency part.

Figure 39:
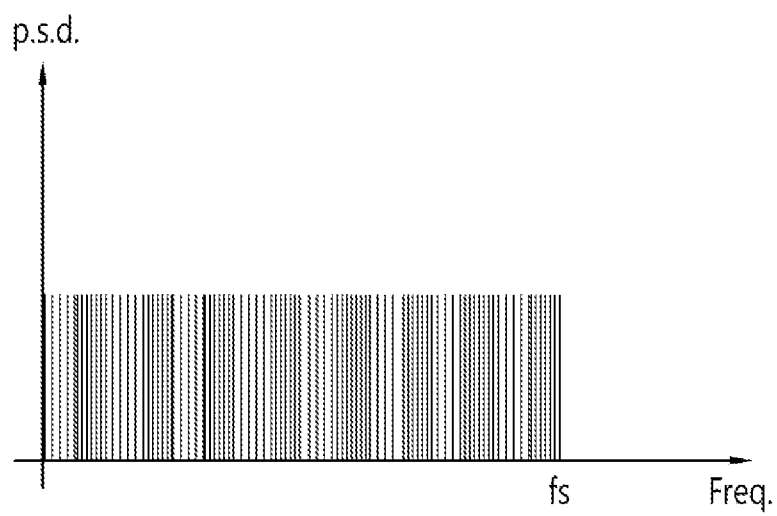
FIG. 39 shows an example of shaping according to the basic block diagram.
Figure 39:
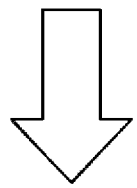
Figure 39:
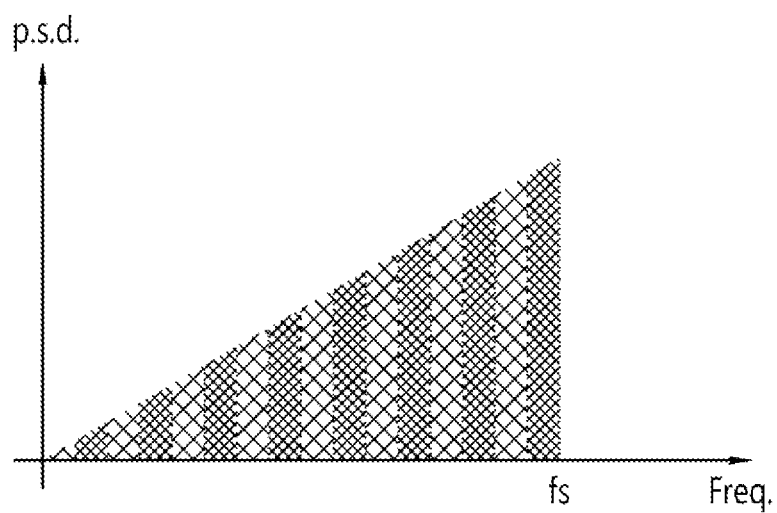

FIG. 39 shows an example of shaping according to the basic block diagram.

Referring to FIG. 39, when shaping is performed, the shape of a power spectrum density (PSD) of a quantization error is changed. In other words, if noise shaping is performed on the quantization error, the total power of the quantization error cannot be reduced, but it can be shifted in frequency. Using this, only the bandwidth of the desired signal is extracted through a filter, and thus the quality of the ADC output signal can be improved. Meanwhile, fs in FIG. 39 may mean a sampling frequency.

Based on the foregoing, a spatial domain noise shaping method in a two-dimensional antenna structure is proposed below.

(Option 1) a Structure that Simultaneously Estimates Horizontal and Vertical AoAs using a divider Option 1 proposes a structure that simultaneously performs noise shaping in a horizontal domain and a vertical domain. To this end, a structure in which a received signal from an antenna is divided into a path for performing horizontal domain noise shaping and a path for performing vertical domain noise shaping through a divider after passing through an RF chain may be considered.

Figure 40:
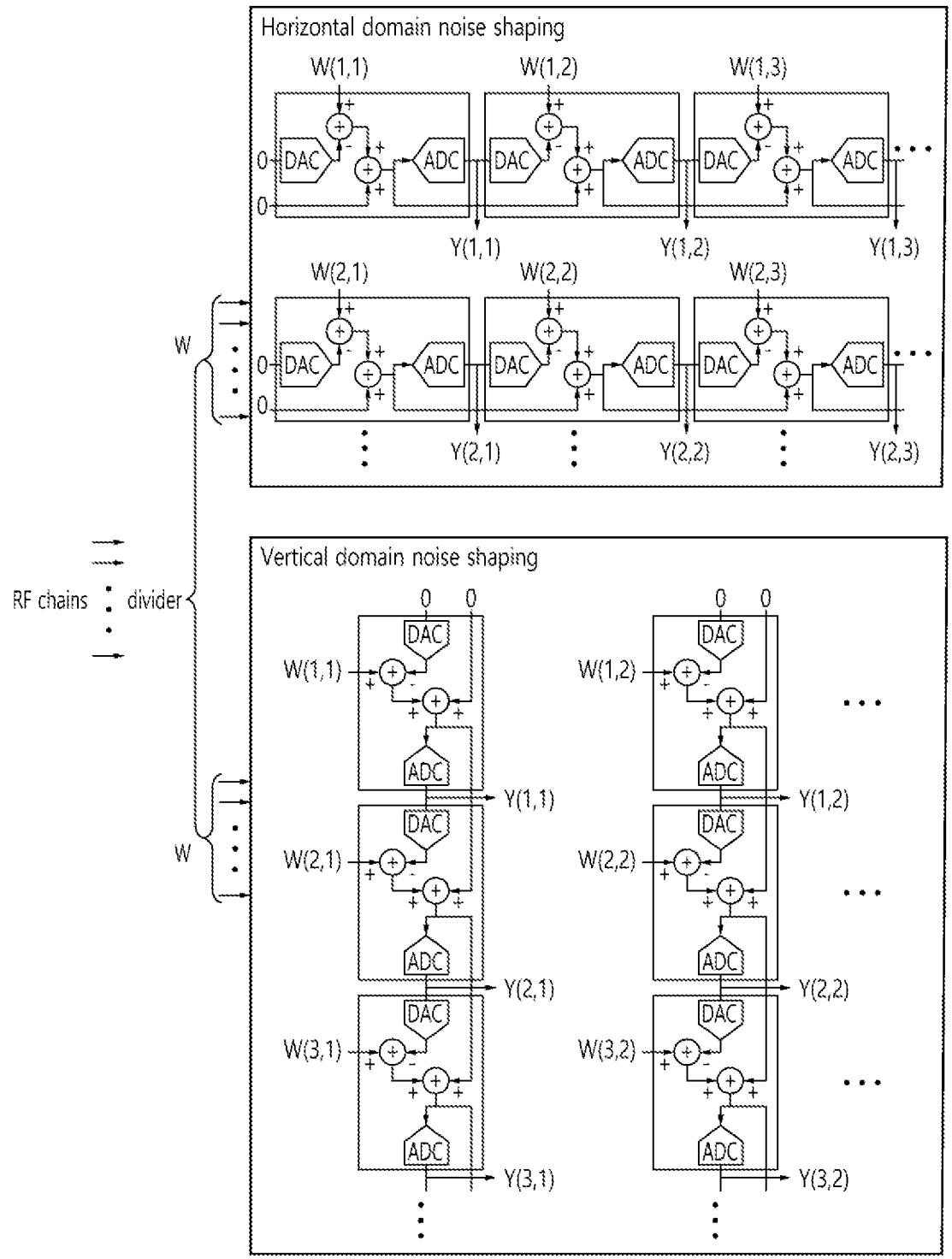
FIG. 40 shows an example of an AoA estimation structure based on Option 1.

FIG. 40 shows an example of an AoA estimation structure based on Option 1.

Referring to FIG. 40, it is divided into a path for performing horizontal domain noise shaping and a path for performing vertical domain noise shaping. Here, W(index1, index2) denotes a received analog signal that has passed through the RF chain from the antennas of index1 in the horizontal direction and index2 in the vertical direction. In addition, Y(index1, index2) denotes a digital signal transmitted to the final baseband through the ADC after passing through the RF chain from the antenna of index1 in the horizontal direction and index2 in the vertical direction.

Referring to the horizontal domain noise shaping part, basically, the output and input of the above-mentioned single blocks are continuously connected. That is, outputs and inputs are connected in the horizontal direction for AoA in the horizontal direction, whereas outputs and inputs of single blocks are connected in the vertical direction for vertical domain noise shaping. When passing through the 1-bit ADC through the above structure, AoA and AoD can be more accurately estimated.

(Option 2) Optional AoA Estimation Structure in Vertical and Horizontal Domains Using Switches In the case of option 1, AoA is simultaneously estimated in the horizontal and vertical directions, whereas option 2 proposes a structure in which AoA is selectively estimated in the vertical or horizontal direction through a switch.

Figure 41:
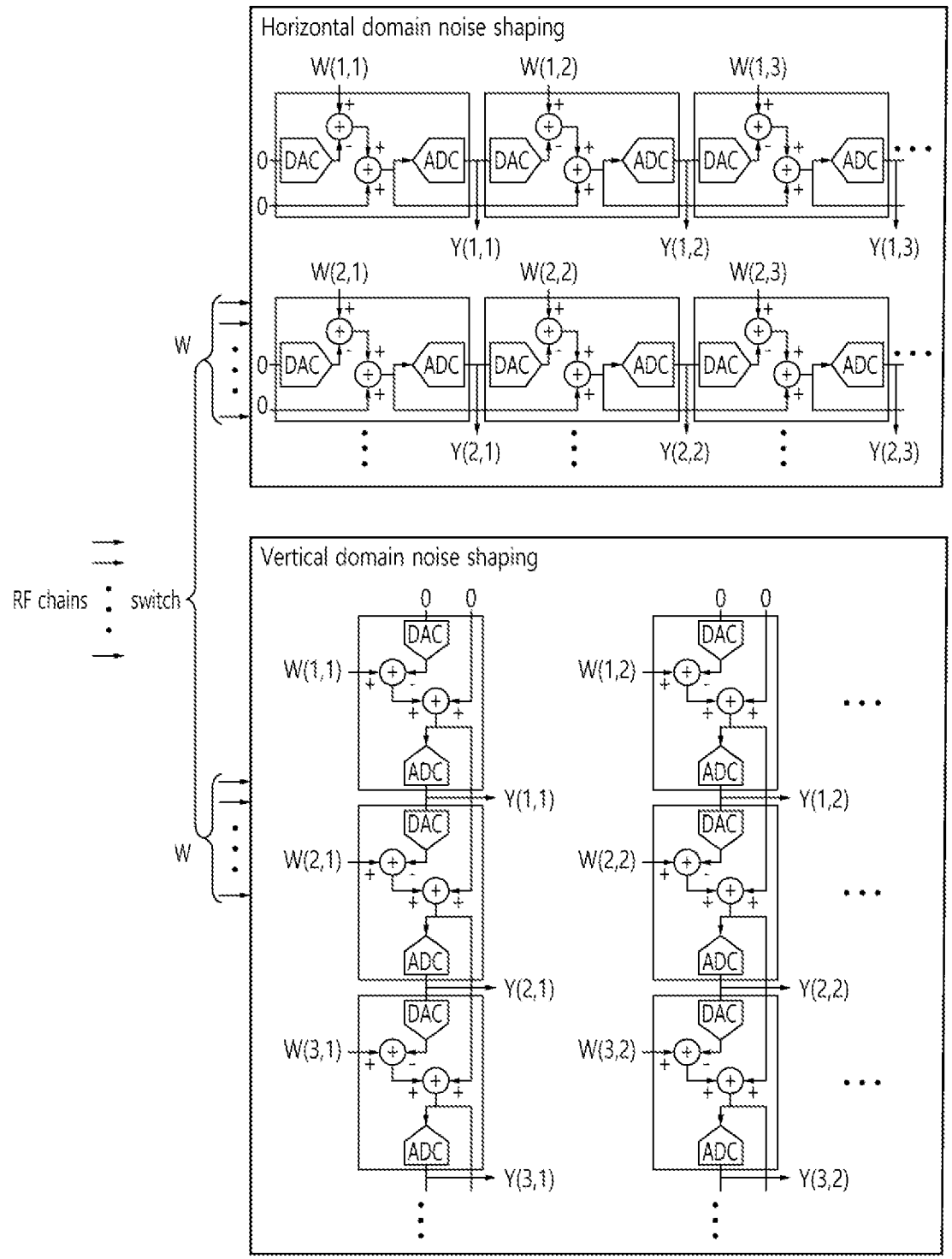
FIG. 41 shows an example of an AoA estimation structure based on Option 2.

FIG. 41 shows an example of an AoA estimation structure based on Option 2.

Referring to FIG. 41, AoA may be selectively estimated through a switch rather than a divider. In Option 2, power is divided in half in the case of the divider, while the switch selectively selects the horizontal or vertical direction, allowing more precise estimation of the AoA in a specific direction without reducing power.

Hereinafter, a method for enhancing AoA and AoD estimation based on continuous transmission of signals is proposed. Specifically, below, a phase resolution enhancement method using a transmission rotated signal for AoA and AoD estimation in a system including a 1-bit ADC receiver is proposed.

Meanwhile, although the above method is described based on Nyquist sampling, it is obvious that the same can be applied to oversampling and undersampling.

During transmission, by transmitting a known signal, for example, a continuous reference signal, the receiving end can increase phase resolution through the received signal.

As an example, a method of increasing the phase resolution by 2 times by continuously transmitting the reference signal twice will be described.

Figure 42:
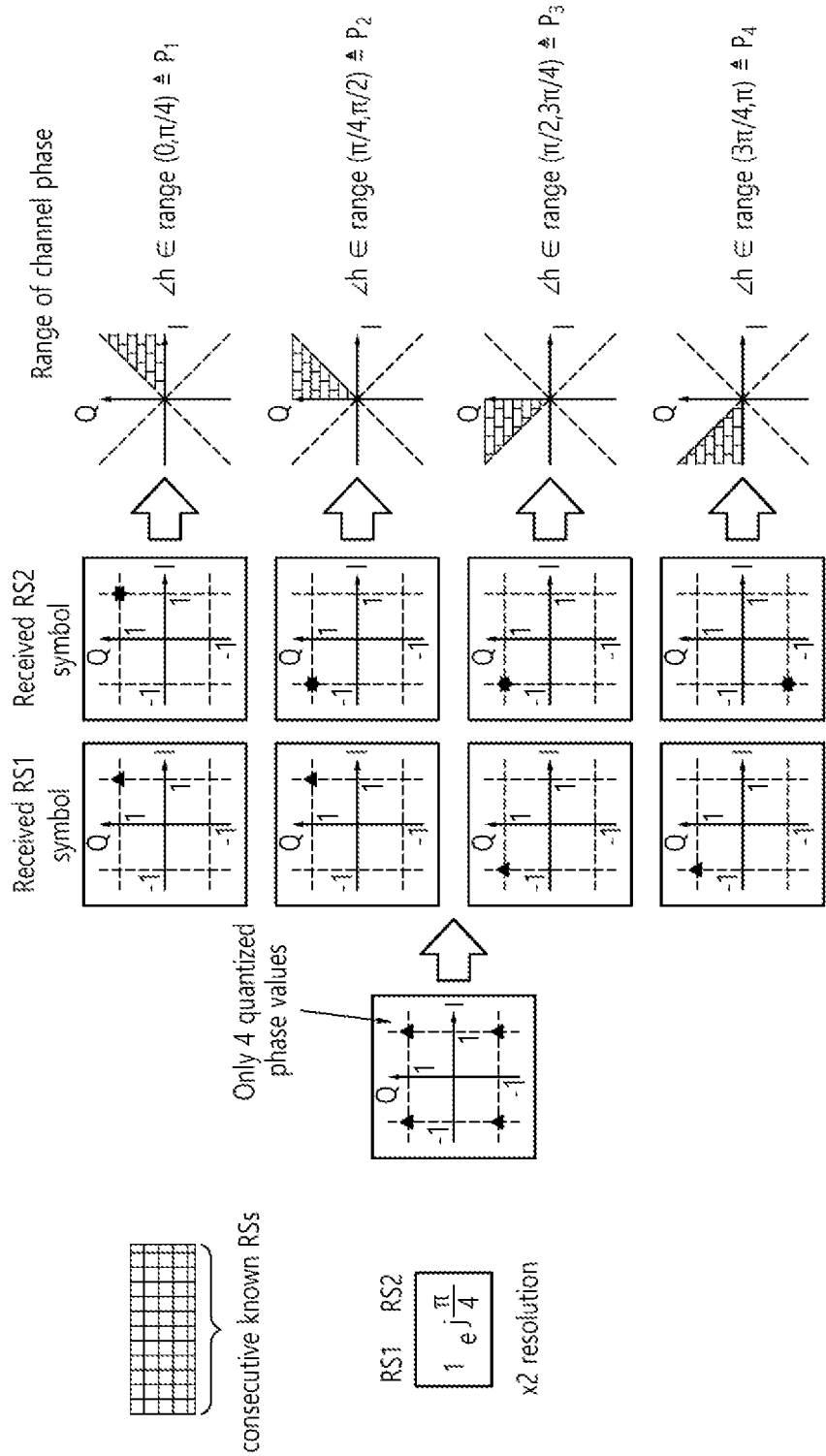
FIG. 42 schematically illustrates an example of a method for increasing phase resolution.

FIG. 42 schematically illustrates an example of a method for increasing phase resolution.

Referring to FIG. 42, the transmitter rotates the phase of the reference signal by $\pi/4$ and transmits it twice, the receiving end can detect the received signal of the reference signal and estimate the phase with a resolution of $\pi/4$ from the existing $\pi/2$ resolution. By utilizing this, AoA estimation performance can be enhanced.

Next, an example in which the phase of the reference signal is rotated by $\pi/8$ and transmitted four times will be described.

Figure 43:
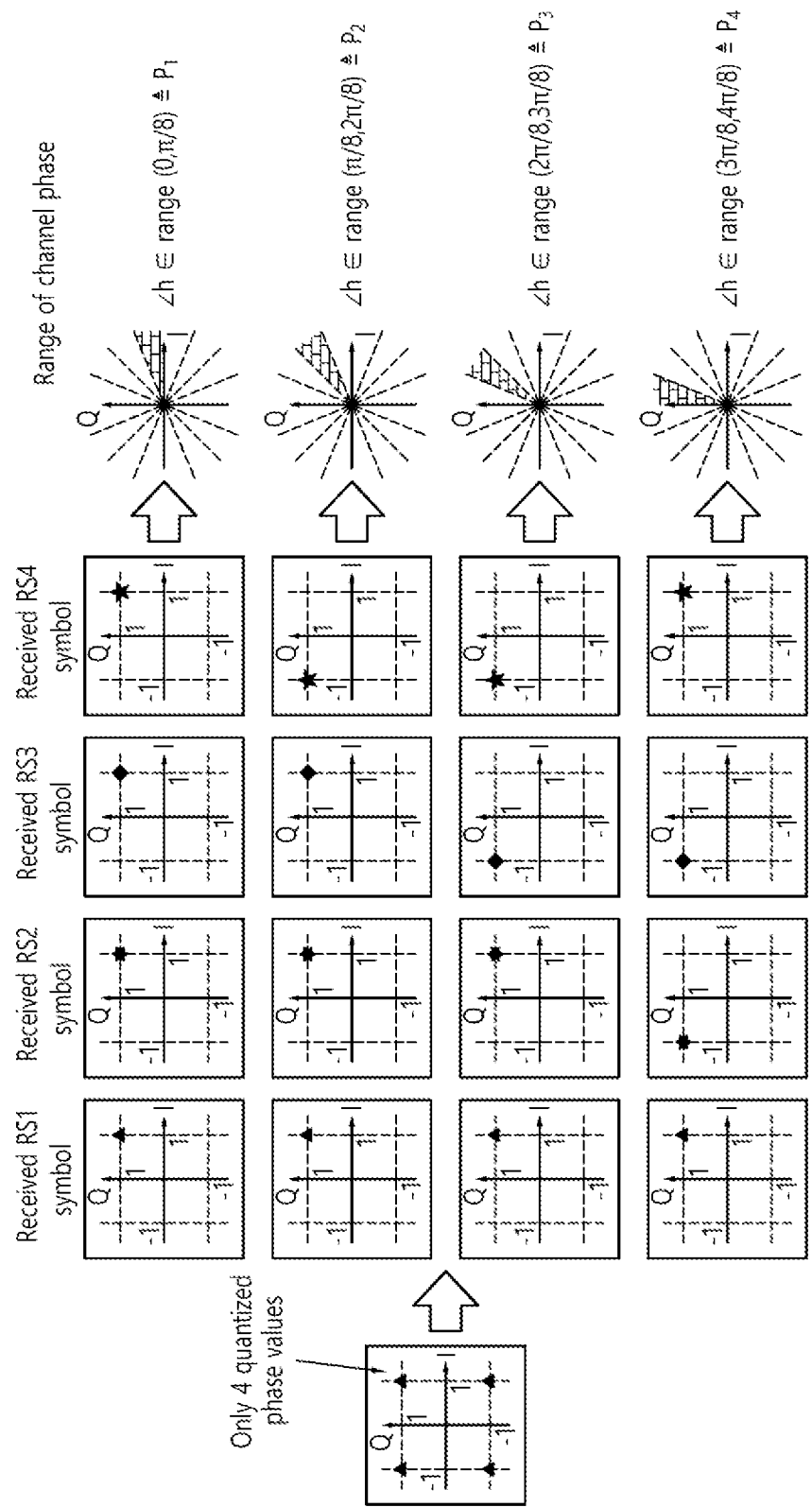
FIG. 43 schematically illustrates another example of a method for increasing phase resolution.

FIG. 43 schematically illustrates another example of a method for increasing phase resolution.

Referring to FIG. 43, the receiving end can estimate the phase from the existing $\pi/2$ resolution to $\pi/8$ resolution by looking at the received signals for the four reference signals.

Therefore, by rotating the phase by $\pi/(2^{M+1})$ in the transmitter and transmitting it N times, the receiver can have a resolution of $\pi/(2^{M+1})$ Through this, AoA can be measured more precisely. Here, it may be $N=2^{M+1}$.

Alternatively, the receiver may have a resolution of $\pi/(2N)$ by rotating the phase by $\pi/(2N)$ in the transmitter and transmitting N times.

The receiver may signal the type of reference signal to the transmitter according to the AoA or AoD resolution condition. For example, when a resolution of $\pi/8$ is required, the transmitter and receiver can make an appointment by signaling RS type=2. That is, a resolution value set for each type of reference signal may be defined in advance, a reference signal related to a specific resolution value may be transmitted through signaling between a transmitter and a receiver.

On the other hand, although the above-described method described the granularity of the resolution as a multiple of 2, it is obvious that it is applicable even when the resolution is not a multiple of 2. In addition, although the above method has been described in terms of AoA, it is obvious that it is applicable to AoD.

Figure 44:
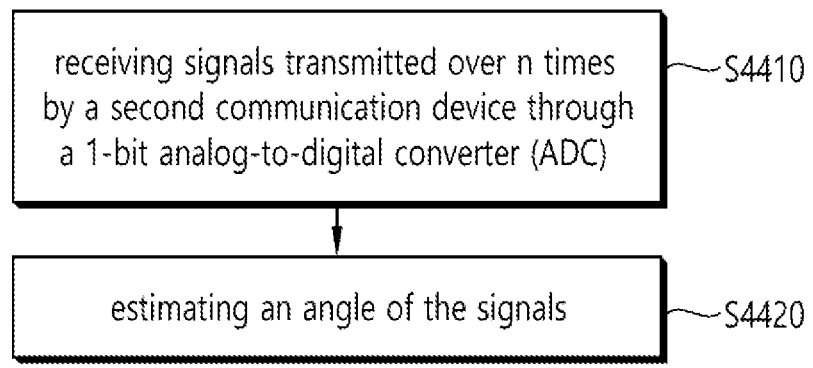
FIG. 44 is a flowchart of an example of a method for measuring an angle of a received signal of a first communication device according to some implementations of the present disclosure.

FIG. 44 is a flowchart of an example of a method for measuring an angle of a received signal of a first communication device according to some implementations of the present disclosure.

Referring to FIG. 44, the first communication device receives signals transmitted n times by the second communication device through a 1-bit analog-to-digital converter (ADC) (S4410). Here, n may be an integer of 2 or greater.

Thereafter, the first communication device estimates the angle of the signal (S4420).

Here, the phase difference of each signal transmitted over the n times may have a specific value.

Meanwhile, the first communication device and each of the first communication devices may be a terminal or a base station.

The claims described in the present disclosure may be combined in various manners. For example, the technical features of the method claims of the present disclosure may be combined and implemented as an apparatus, and the technical features of the apparatus claims of the present disclosure may be combined and implemented as a method. In addition, the technical features of the method claims of the present disclosure and the technical features of the apparatus claims may be combined and implemented as an apparatus, and the technical features of the method claims of the present disclosure and the technical features of the apparatus claims may be combined and implemented as a method.

In addition to a UE, the methods proposed in the present disclosure may be performed by an apparatus configured to control the UE, which includes at least one computer-readable recording medium including an instruction based on being executed by at least one processor, one or more processors, and one or more memories operably coupled by the one or more processors and storing instructions, wherein the one or more processors execute the instructions to perform the methods proposed in the present disclosure. Further, it is obvious that an operation of a base station corresponding to an operation performed by the UE may be considered according to the methods proposed in the present disclosure.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 45:
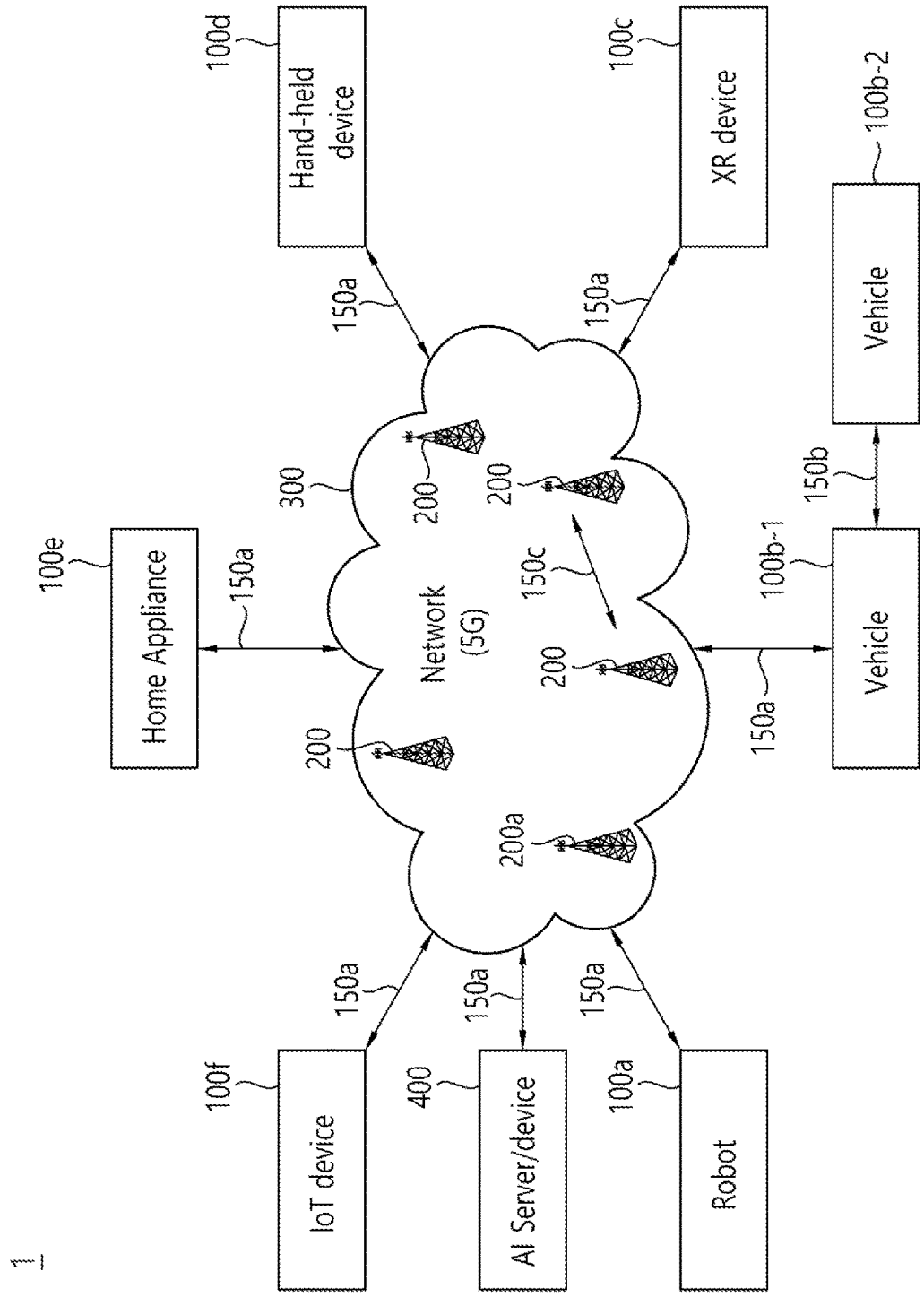
FIG. 45 illustrates a communication system 1 applied to the disclosure.

FIG. 45 illustrates a communication system 1 applied to the disclosure.

Referring to FIG. 45, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 46:
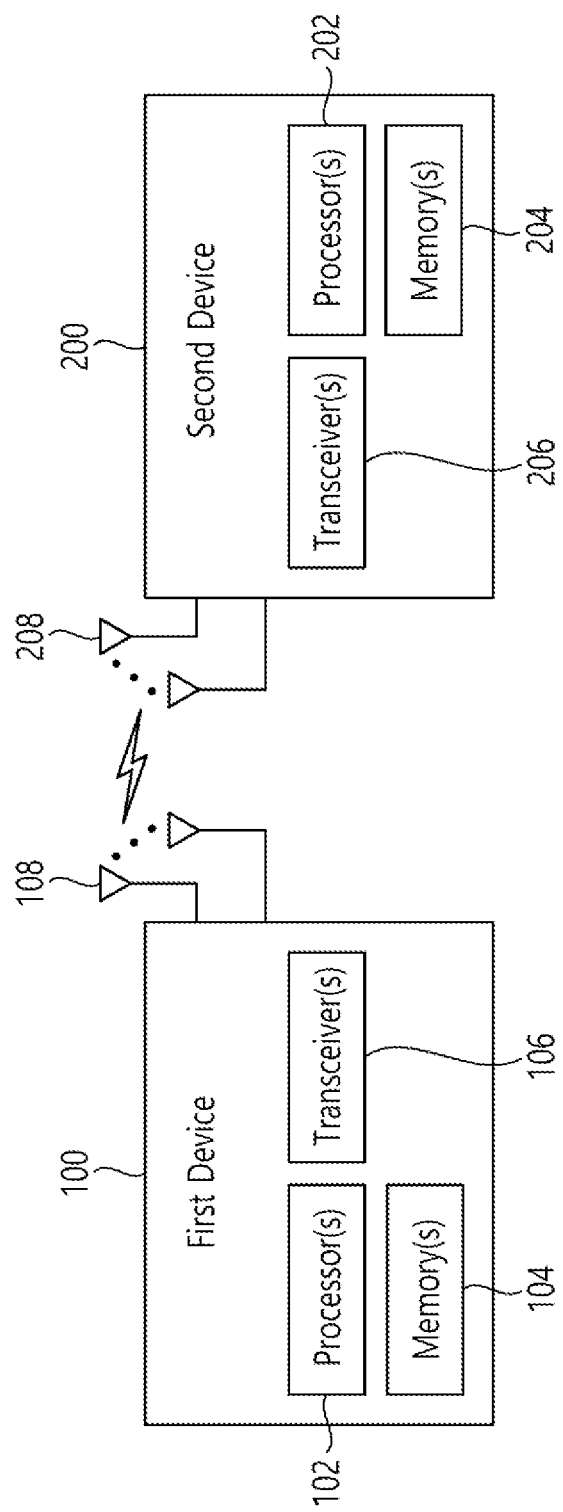
FIG. 46 illustrates a wireless device that is applicable to the disclosure.

FIG. 46 illustrates a wireless device that is applicable to the disclosure.

Referring to FIG. 46, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 45 and/or may respectively correspond to a wireless device 100x and a wireless device 100x of FIG. 45.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 47:
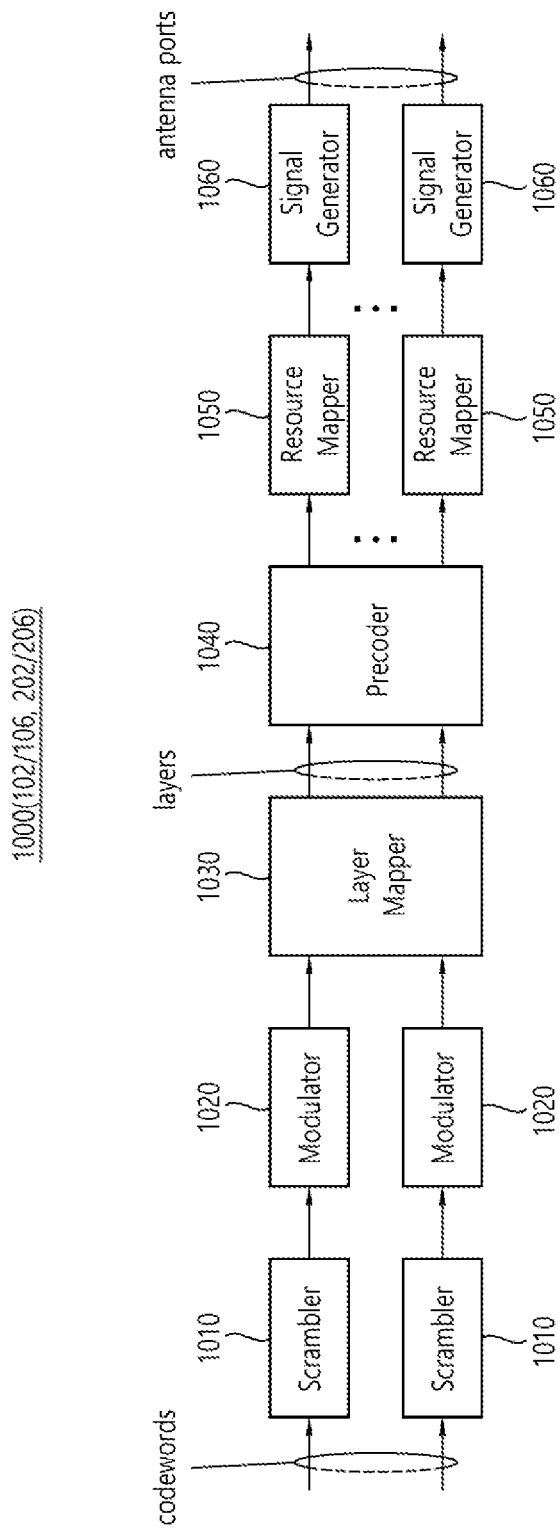
FIG. 47 illustrates a signal processing circuit for a transmission signal.

FIG. 47 illustrates a signal processing circuit for a transmission signal.

Referring to FIG. 47, the signal processing circuit 1000 may include a scrambler 1010, a modulator 1020, a layer mapper 1030, a precoder 1040, a resource mapper 1050, and a signal generator 1060. Operations/functions illustrated with reference to FIG. 47 may be performed, but not limited to, in the processor 102 and 202 and/or the transceiver 106 and 206 of FIG. 46. Hardware elements illustrated in FIG. 47 may be configured in the processor 102 and 202 and/or the transceiver 106 and 206 of FIG. 46. For example, blocks 1010 to 1060 may be configured in the processor 102 and 202 of FIG. 46. Alternatively, blocks 1010 to 1050 may be configured in the processor 102 and 202 of FIG. 46, and a block 1060 may be configured in the transceiver 106 and 206 of FIG. 46.

A codeword may be converted into a radio signal via the signal processing circuit 1000 of FIG. 47. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 47. For example, a wireless device (e.g., 100 and 200 of FIG. 46) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 48:
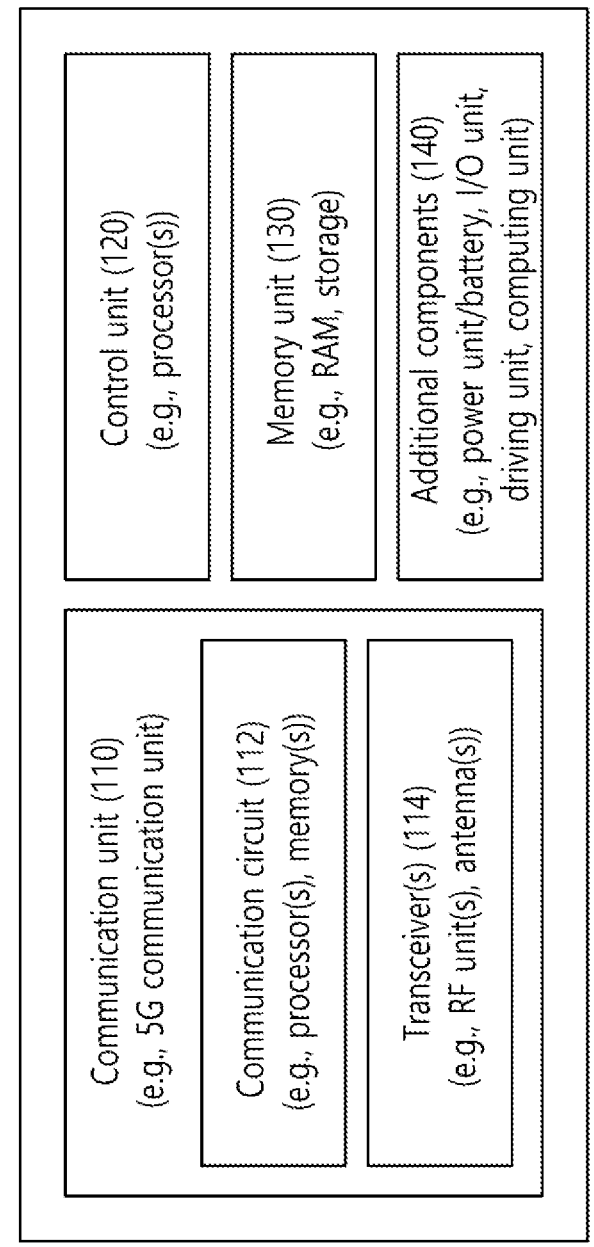
FIG. 48 illustrates another example of a wireless device applied to the disclosure. The wireless device may be configured in various forms depending on usage/service.

FIG. 48 illustrates another example of a wireless device applied to the disclosure. The wireless device may be configured in various forms depending on usage/service.

Referring to FIG. 48, the wireless devices 100 and 200 may correspond to the wireless device 100 and 200 of FIG. 46 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 46. For example, the transceiver(s) 114 may include the at least one transceiver 106 and 206 and/or the at least one antenna 108 and 208 of FIG. 46. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 45), a vehicle (100b-1 or 100b-2 in FIG. 45), an XR device (100c in FIG. 45), a hand-held device (100d in FIG. 45), a home appliance (100e in FIG. 45), an IoT device (100f in FIG. 45), a terminal for digital broadcasting, a hologram device, a public safety device, an MTC device, a medical device, a fintech device (or financial device), a security device, a climate/environmental device, an AI server/device (400 in FIG. 45), a base station (200 in FIG. 45), a network node, or the like. The wireless device may be mobile or may be used in a fixed place depending on usage/service.

In FIG. 48, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 48 is described in detail with reference to the accompanying drawing.

Figure 49:
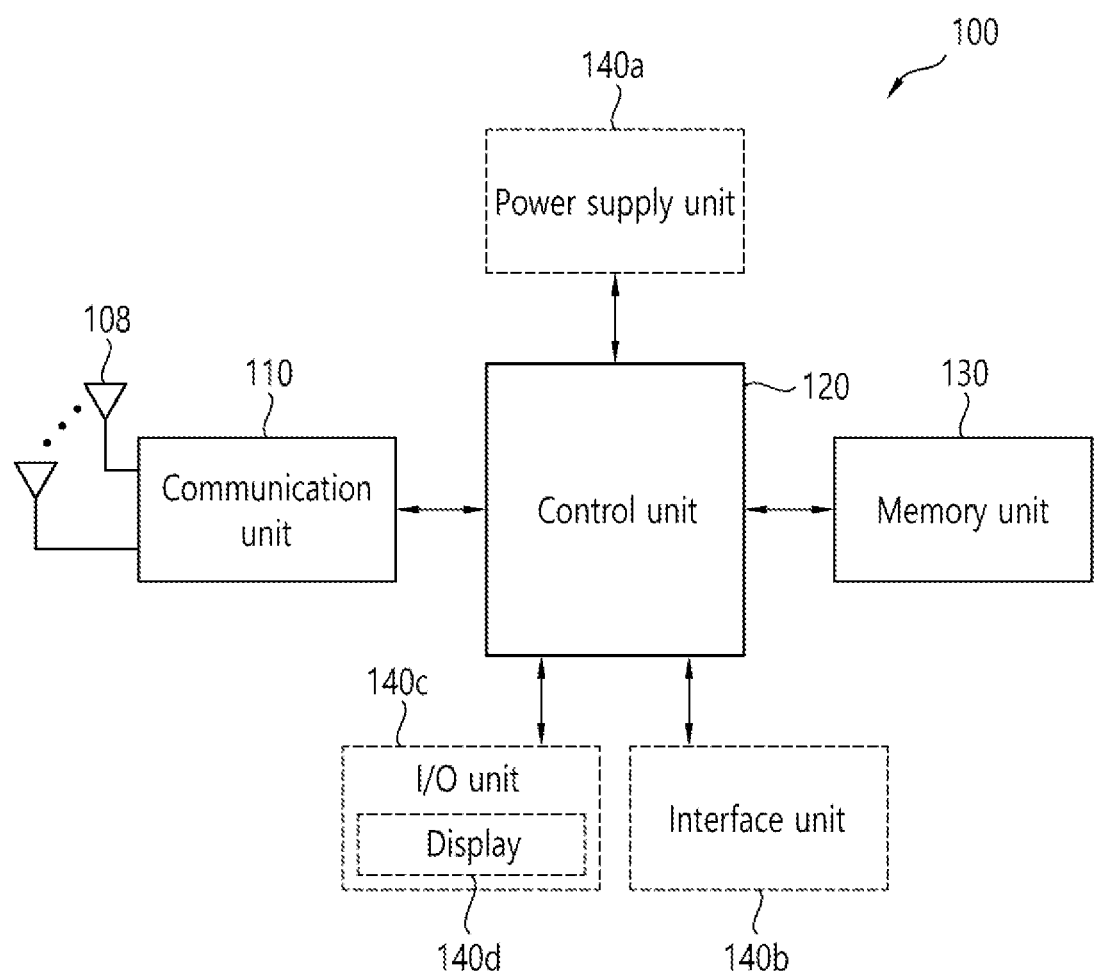
FIG. 49 illustrates a hand-held device applied to the disclosure.

FIG. 49 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 49, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 48, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 50:
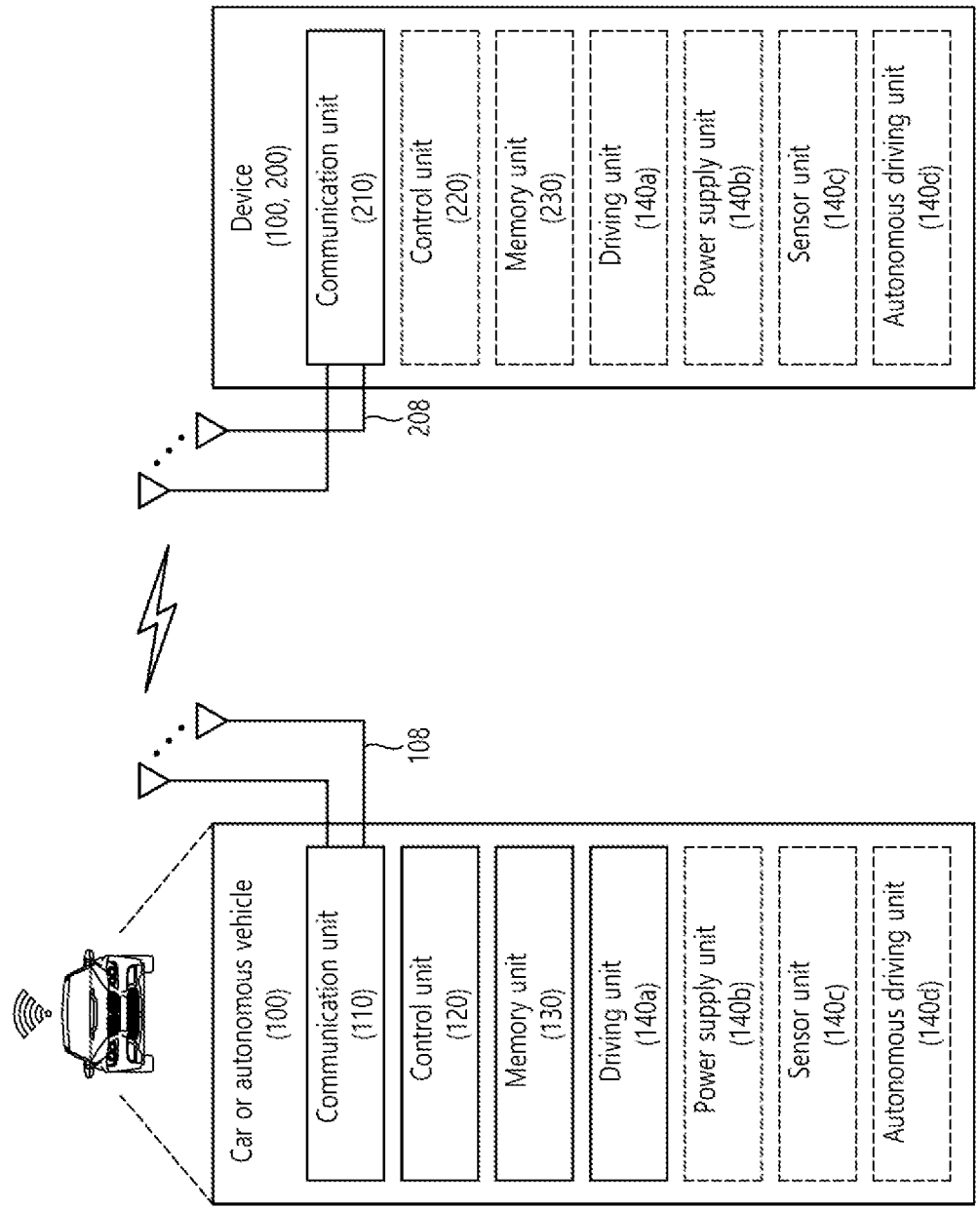
FIG. 50 illustrates a vehicle or an autonomous driving vehicle applied to the disclosure.

FIG. 50 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 50, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 48, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehiclular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 51:
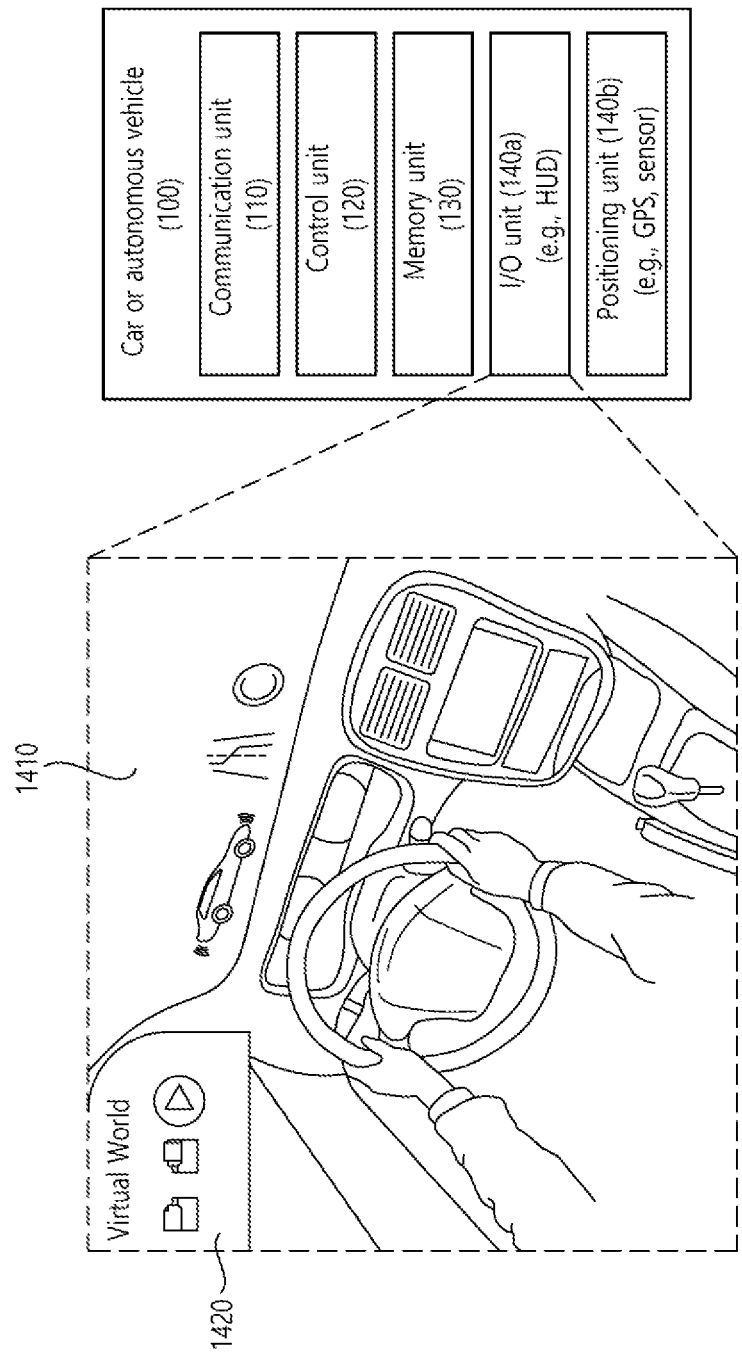
FIG. 51 illustrates a vehicle applied to the disclosure.

FIG. 51 illustrates a vehicle applied to the disclosure. The vehicle may be implemented as a means of transportation, a train, an air vehicle, a ship, and the like.

Referring to FIG. 51, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 48, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 52:
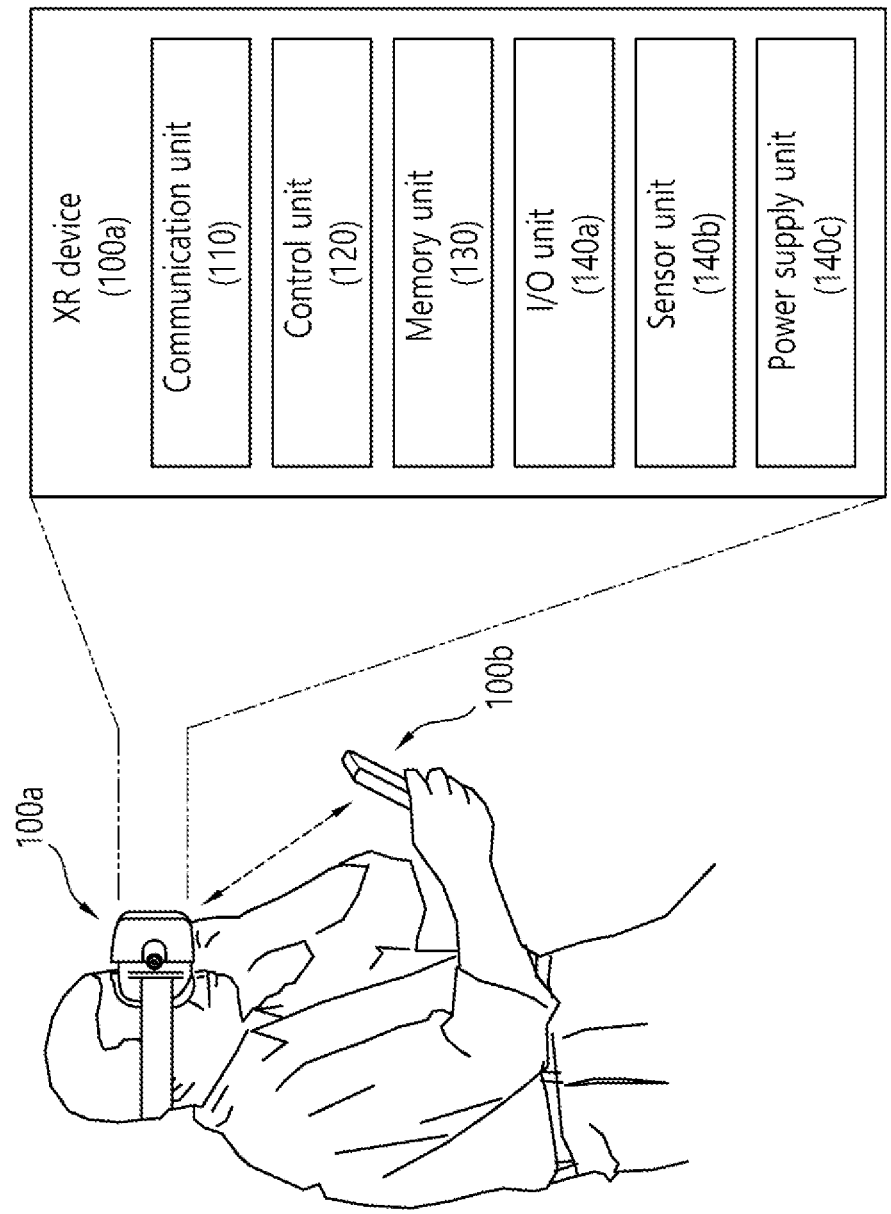
FIG. 52 illustrates a XR device applied to the disclosure.

FIG. 52 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 52, the XR device 100a may include a communication unit 110, a control unit 120, a memory unit 130, an input/output unit 140a, a sensor unit 140b and a power supply unit 140c. Herein, blocks 110 to 130/140a to 140c correspond to blocks 110 to 130/140 in FIG. 48.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100a to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100a/creating an XR object. The input/output unit 140a may obtain control information, data, and the like from the outside, and may output the generated XR object. The input/output unit 140a may include a camera, a microphone, a user input unit, a display unit, a speaker, and/or a haptic module. The sensor unit 140b may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140b An XR object can be generated/output based on information about one surrounding space or a real object.

Also, the XR device 100a is wirelessly connected to the portable device 100b through the communication unit 110, and the operation of the XR device 100a may be controlled by the portable device 100b. For example, the portable device 100b may operate as a controller for the XR device 100a. To this end, the XR device 100a may obtain 3D location information of the portable device 100b, and then generate and output an XR object corresponding to the portable device 100b.

Figure 53:
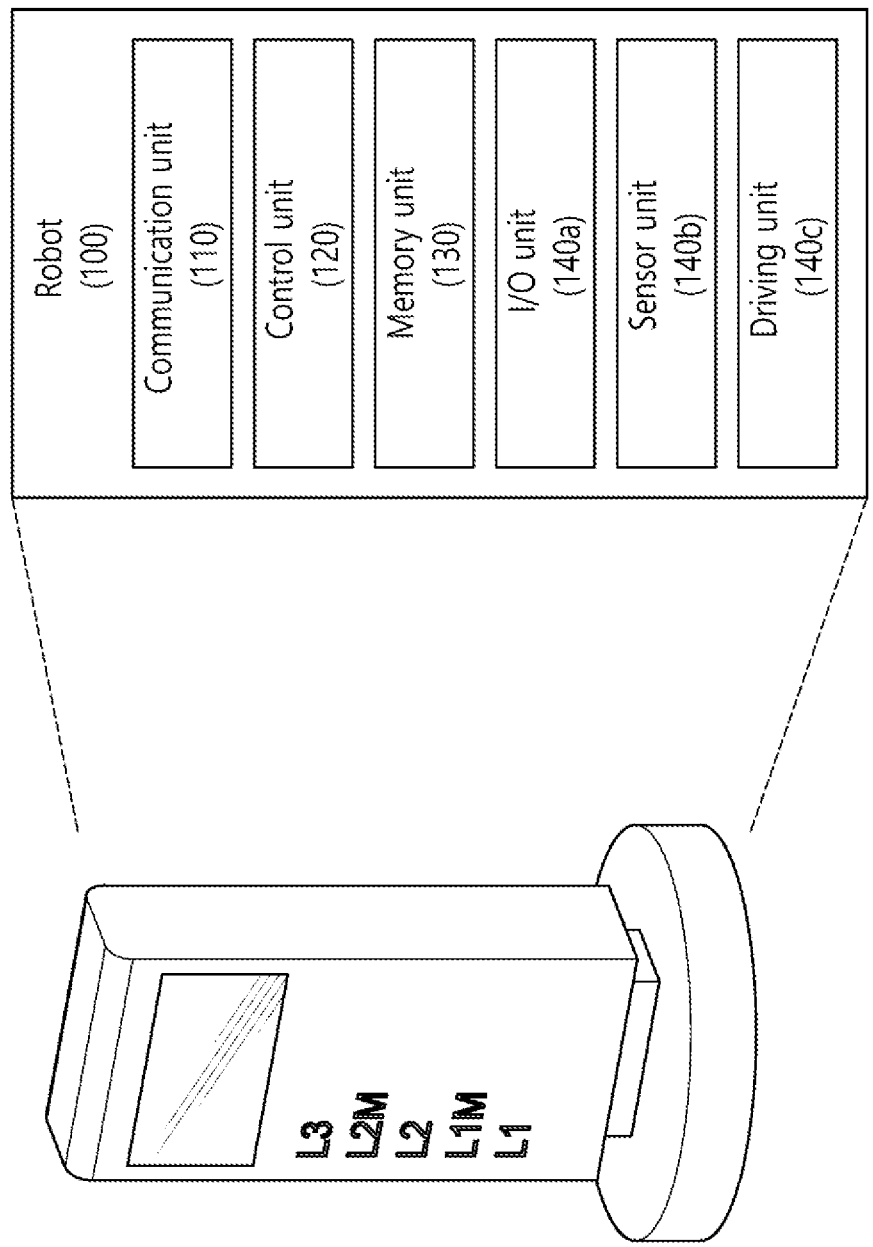
FIG. 53 illustrates a robot applied to the disclosure.

FIG. 53 illustrates a robot applied to the disclosure. The robot may be classified into industrial, medical, home, military, and the like depending on the purpose or field of use.

Referring to FIG. 53, the robot 100 may include a communication unit 110, a control unit 120, a memory unit 130, an input/output unit 140a, a sensor unit 140b, and a driving unit 140c. Herein, blocks 110 to 130/140a to 140c correspond to blocks 110 to 130/140 in FIG. 48.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 54:
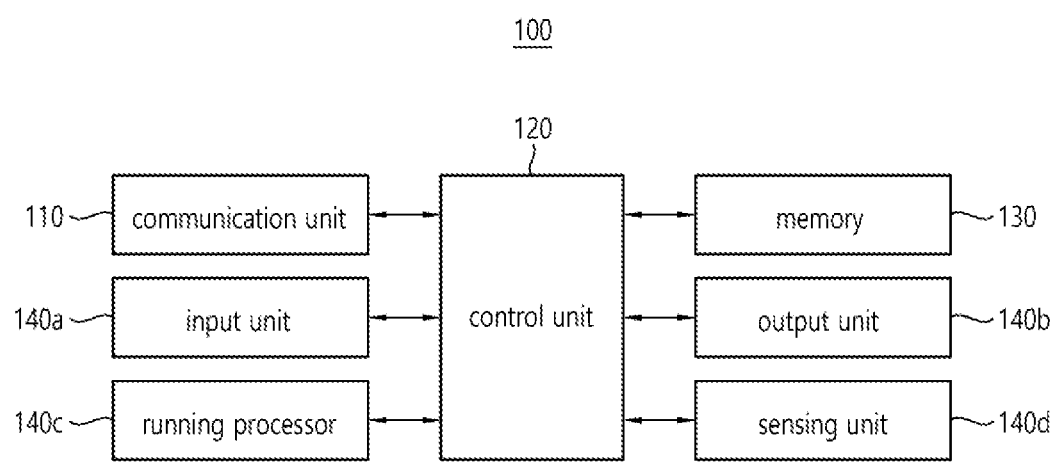
FIG. 54 illustrates an AI device applied to the disclosure.

FIG. 54 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 54, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 48, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 45) or an AI server (e.g., 400 in FIG. 45) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 45). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 45). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method for a received signal angle estimation, the method performed by a first communication device and comprising:
    performing a random access procedure with a second communication device for an initial access, wherein the random access procedure comprises transmitting a random access preamble to the second communication device, receiving a random access response from the second communication device, performing a scheduled transmission to the second communication device using an uplink grant in the random access response, and monitoring a contention resolution;
    receiving a reference signal from the second communication device through a 1-bit analog-to-digital converter (ADC); and
    performing an angle estimation of the reference signal,
    wherein the angle estimation is performed based on vertical arrangement estimation and horizontal arrangement estimation based on antennas arranged in two dimensions at the first communication device.

2. The method of claim 1, wherein the vertical arrangement estimation and the horizontal arrangement estimation are performed simultaneously based on a divider.

3. The method of claim 1, wherein the vertical arrangement estimation and the horizontal arrangement estimation are selectively performed based on a switch.

4. The method of claim 1, wherein the angle estimation is an estimation of angle of departure or an estimation angle of arrival.

5. A first communication device comprising:
    at least one transceiver;
    at least one memory; and
    at least one processor operably connectable to the at least one transceiver and the at least one memory,
    wherein the at least one memory stores instructions that, based on being executed by the at least one processor, cause the at least one processor to perform operations comprising:
    performing a random access procedure with a second communication device for an initial access, wherein the random access procedure comprises transmitting a random access preamble to the second communication device, receiving a random access response from the second communication device, performing a scheduled transmission to the second communication device using an uplink grant in the random access response, and monitoring a contention resolution;
    receiving a reference signal from the second communication device through a 1-bit analog-to-digital converter (ADC); and
    performing an angle estimation of the reference signal,
    wherein the angle estimation is performed based on vertical arrangement estimation and horizontal arrangement estimation based on antennas arranged in two dimensions at the first communication device.

6. The first communication device of claim 5, wherein the vertical arrangement estimation and the horizontal arrangement estimation are performed simultaneously based on a divider.

7. The first communication device of claim 5, wherein the vertical arrangement estimation and the horizontal arrangement estimation are selectively performed based on a switch.

8. The first communication device of claim 5, wherein the angle estimation is an estimation of angle of departure or an estimation angle of arrival.

\* \* \* \* \*